United States Patent
Kawamura et al.

(10) Patent No.: US 9,079,998 B2
(45) Date of Patent: Jul. 14, 2015

(54) AQUEOUS DISPERSION AND AQUEOUS COATING COMPOSITION, AND PROCESS OF FORMING COATING FILM

(75) Inventors: Chikara Kawamura, Kanagawa (JP); Hiroaki Tanaka, Kanagawa (JP); Hiroyuki Wakamatsu, Kanagawa (JP); Yuuichi Inada, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 803 days.

(21) Appl. No.: 12/935,799

(22) PCT Filed: Mar. 26, 2009

(86) PCT No.: PCT/JP2009/056839
§ 371 (c)(1),
(2), (4) Date: Sep. 30, 2010

(87) PCT Pub. No.: WO2009/123275
PCT Pub. Date: Oct. 8, 2009

(65) Prior Publication Data
US 2011/0034622 A1 Feb. 10, 2011

(30) Foreign Application Priority Data

Apr. 1, 2008 (JP) ................. 2008-094510
Aug. 6, 2008 (JP) ................. 2008-202928
Jan. 15, 2009 (JP) ................. 2009-006716

(51) Int. Cl.
| C08F 2/20 | (2006.01) |
| C08F 2/48 | (2006.01) |
| C08F 2/44 | (2006.01) |
| C08F 220/18 | (2006.01) |
| C08F 220/14 | (2006.01) |
| C08F 220/28 | (2006.01) |
| C08F 251/00 | (2006.01) |
| C08F 285/00 | (2006.01) |
| C08F 290/10 | (2006.01) |
| C08B 31/00 | (2006.01) |
| C09D 5/02 | (2006.01) |
| C09D 103/02 | (2006.01) |
| C09D 151/02 | (2006.01) |

(52) U.S. Cl.
CPC ............. *C08F 285/00* (2013.01); *C08B 31/003* (2013.01); *C08F 2/20* (2013.01); *C08F 2/44* (2013.01); *C08F 2/48* (2013.01); *C08F 220/14* (2013.01); *C08F 220/18* (2013.01); *C08F 220/28* (2013.01); *C08F 251/00* (2013.01); *C08F 290/10* (2013.01); *C09D 5/02* (2013.01); *C09D 103/02* (2013.01); *C09D 151/02* (2013.01); *C08L 2666/02* (2013.01)

(58) Field of Classification Search
CPC ........ C08F 2/20; C08F 290/10; C08F 285/00; C08F 251/10; C08F 2/48; C08F 2/44; C08F 220/28; C08F 220/18; C08F 220/14; C08B 31/003; C09D 151/02; C09D 103/02; C09D 5/02; C08L 2666/02
USPC .......................................................... 524/47
See application file for complete search history.

(56) References Cited

U.S. PATENT DOCUMENTS

| 5,280,055 A | 1/1994 | Tomka |
| 5,714,540 A | 2/1998 | Tanaka et al. |
| 6,040,379 A | 3/2000 | Luebke et al. |
| 2004/0152857 A1 | 8/2004 | Ohnishi et al. |
| 2007/0275258 A1* | 11/2007 | Ohnishi et al. ................. 428/532 |
| 2007/0287777 A1* | 12/2007 | Kawamura et al. ............. 524/47 |
| 2008/0027174 A1* | 1/2008 | Kawamura et al. ........ 525/54.26 |

FOREIGN PATENT DOCUMENTS

| CN | 1275179 A | 11/2000 |
| JP | 6 207047 | 7/1996 |
| JP | 8239402 | 9/1996 |
| JP | 2001 40267 | 2/2001 |
| JP | 2004 224887 | 8/2004 |
| JP | 2006 52338 | 2/2006 |
| JP | 2006 282960 | 10/2006 |

OTHER PUBLICATIONS

Kansai Paint Co Ltd., "Curable Starch Composition," Patent Abstracts of Japan, Publication Date: Oct. 19, 2006; English Abstract of JP 2006 282960.
Kansai Paint Co Ltd., "Water Dispersion of Modified Starch-Containing Resin and Method for Producing the Water Dispersion," Patent Abstract of Japan, Publication Date: Feb. 23, 2006; English Abstract of JP 2006 052338.
Natl Starch & Chem Investment Holding Corp., "Starch Ester Coating," Patent Abstracts of Japan, Publication Date: Feb. 13, 2001; English Abstract of JP 2001040267.
Bibliographic data: CN1275179A—Nov. 19, 2000—Leubke G et al., Abstract of CN 1275179A.

* cited by examiner

*Primary Examiner* — Angela C Scott
(74) *Attorney, Agent, or Firm* — Millen, White, Zelano & Branigan, P.C.

(57) ABSTRACT

It is an object of the present invention to provide an aqueous dispersion of acrylic modified starch with excellent long-term storage stability, as well as an aqueous coating composition that can form a coated film with excellent finished appearance, curability and weather resistance, obtained using the dispersion.
The aqueous dispersion of the present invention is obtained by separate graft polymerization of a radical polymerizable unsaturated monomer mixture for formation of a hydrophobic polymer and a radical polymerizable unsaturated monomer mixture for formation of a hydrophilic polymer, in the presence of starch and/or modified starch, and neutralizing the carboxyl groups in the acrylic modified starch with a basic substance if necessary.

8 Claims, No Drawings

AQUEOUS DISPERSION AND AQUEOUS COATING COMPOSITION, AND PROCESS OF FORMING COATING FILM

TECHNICAL FIELD

The present invention relates, firstly, to an aqueous dispersion with excellent storage stability that employs starch as a plant-derived starting material, and to an aqueous coating composition that can form coated films with excellent finished appearance, curability and weather resistance, which is obtained using the aqueous dispersion.

The present invention relates, secondly, to an aqueous dispersion with excellent storage stability that employs starch as a plant-derived starting material, and to an aqueous coating composition with excellent curability that can form coated films with excellent solvent resistance, chemical resistance and water resistance, which is obtained using the aqueous dispersion.

The present invention relates, thirdly, to a base coating film formed from an aqueous coating composition employing starch as a plant-derived starting material, to a process of forming a coating film in which a coating film formed from a saccharide-employing active energy radiation curable coating composition is laminated on the base coating film, and to coated articles obtained by the process of forming a coating film.

BACKGROUND ART

In recent years, development of environmentally-friendly products has continued to advance in the coating material industry, as environmental pollution increases and society shifts toward greater recycling with the aim of reducing the burden on the environment. In light of this situation, various coating agents employing materials with biodegrading action have been proposed, since they naturally do not contain significant amounts of volatile organic compounds (VOC), such as toluene and xylene, that can pollute the indoor environment, but, also do not cause soil contamination after disposal.

In Japanese Unexamined Patent Publication No. 2004-224887, for example, there is disclosed a curable starch composition which is a mixture of starch and a curing agent having a functional group that reacts in a complementary manner with at least one hydroxyl group in the starch molecule. It is stated that the curable starch composition can be used in a form dispersed in an aqueous solvent. However, it is not easy to achieve stable dispersion of starch in aqueous media.

Japanese Unexamined Patent Publication No. 2001-40267 discloses a releasable or moisture-proof coating composition comprising a specific starch ester, a hydrophobic plasticizer and water. However, the starch ester used here is hydrophobic and therefore poorly dispersible in water, and the finished appearance of the formed coating film at ordinary temperature is poor.

Also, Japanese Unexamined Patent Publication No. 2006-52338 discloses a modified starch-containing resin aqueous dispersion comprising a (co)polymer of modified starch and a polymerizable unsaturated monomer as constituent components. Although the storage stability of the aqueous dispersion is significantly improved due to the aid of the copolymer resin, long-term storage nevertheless often results in settling of the dispersion particles and increasing viscosity of the dispersion, thus limiting the freedom of the coating material design.

Japanese Unexamined Patent Publication No. 8-239402, on the other hand, discloses an invention relating to graft starch obtained by indirectly grafting a starch resin and acrylic resin through a polyisocyanate, and graft starch obtained by radical graft polymerization of an unsaturated monomer onto starch or modified starch.

As an example of combining starch with another plant-derived resin, Japanese Unexamined Patent Publication No. 6-207047 discloses an invention wherein a polymer blend comprising a combination of starch or modified starch with a cellulose derivative is used as a molding material. There are also disclosed inventions relating to resin compositions employing starch-based resins as water-absorbing resins.

This prior patent literature clearly demonstrates that starch-based resins obtained by combining or grafting different polymers are themselves known. However, all of these techniques assume that the uses of the starch-based resins are for adhesives, structural materials, injection molding materials, sheets or the like, whereas virtually no uses as coating materials have been disclosed.

Also, Japanese Unexamined Patent Publication No. 2006-282960 discloses a curable starch composition comprising starch, a polyisocyanate curing agent, a plant-derived resin other than starch, a metal complex, and a blocking agent selected from among $\beta$-diketones, acetoacetic acid esters, malonic acid esters, ketones with $\beta$-hydroxyl groups, aldehydes with $\beta$-hydroxyl groups and esters with $\beta$-hydroxyl groups.

However, a method of forming coating films using these starch-based coating materials, allowing formation of coating films with excellent finished appearance, pencil hardness, mar resistance, adhesion, weather resistance, alkali resistance and solvent resistance on substrates, has not existed. In addition, because most of the coating materials used are organic solvent-based coating materials, the usage of large amounts of solvents has been a problem.

DISCLOSURE OF THE INVENTION

It is a first object of the present invention to provide an aqueous dispersion of acrylic modified starch that does not produce deposition of dispersion particles or increased dispersion viscosity even during prolonged storage, to provide an aqueous coating composition using the aqueous dispersion, that can form coating films with excellent finished appearance, hardness, weather resistance, etc., and to provide coated articles with excellent finished appearance, curability, weather resistance, etc., obtained by application of the aqueous coating composition.

It is a second object of the present invention to provide an aqueous dispersion of acrylic modified starch that does not produce deposition of dispersion particles or increased dispersion viscosity even during storage for fairly long periods, to provide an aqueous coating composition using the aqueous dispersion, that can form coated films with excellent finished appearance, hardness, weather resistance, etc., and to provide coated articles with excellent hardness, weather resistance, etc., obtained by application of the aqueous coating composition.

It is a third object of the present invention to provide a process of forming a coating film which employs starch and/or modified starch, or a saccharide and/or derivative thereof, as the starting material for the coating composition, and that can yield a multilayer coating film that has excellent finished appearance, pencil hardness, mar resistance, interlayer adhesion, weather resistance, alkali resistance and solvent resistance, and can reduce organic solvent usage.

The following means [I], [II] and [III] are provided to achieve the first to third objects.

[I] In order to achieve the first object there is provided the invention according to claims 1 to 7, which include the invention of an aqueous dispersion (X) obtained by radical polymerization reaction of a radical polymerizable unsaturated monomer mixture (b1) in the presence of starch and/or modified starch (a) to obtain a reaction product, radical polymerization reaction of a radical polymerizable unsaturated monomer mixture (b2) in the presence of the reaction product to obtain an acrylic modified starch (A), and then dispersing the acrylic modified starch (A) in an aqueous medium, wherein the radical polymerizable unsaturated monomer mixture (b1) consists of less than 5% by mass of a carboxyl group-containing radical polymerizable unsaturated monomer, 5-95% by mass of a hydroxyl group-containing radical polymerizable unsaturated monomer and 5-95% by mass of other radical polymerizable unsaturated monomers, the radical polymerizable unsaturated monomer mixture (b2) consists of 5-95% by mass of a carboxyl group-containing radical polymerizable unsaturated monomer, 5-95% by mass of a hydroxyl group-containing radical polymerizable unsaturated monomer and 0-90% by mass of other radical polymerizable unsaturated monomers, and the acid value of the acrylic modified starch (A) is in the range of 10-150 mgKOH/g.

The aqueous dispersion (X) is obtained by separate graft polymerization of a radical polymerizable unsaturated monomer mixture for formation of a hydrophobic polymer and a radical polymerizable unsaturated monomer mixture for formation of a hydrophilic polymer, in the presence of starch and/or modified starch, and forming an aqueous dispersion with neutralization of the carboxyl groups in the acrylic modified starch with a basic substance if necessary. It is presumed that forming hydrophobic side-chains and hydrophilic side chains on the starch and/or modified starch in this process causes the core sections and shell sections to be clearly delineated in the particles when they are dispersed in water and results in formation of firm particles, while the particle sizes are also smaller compared to an aqueous dispersion of acrylic modified starch in which hydrophilic side chains are simply introduced into starch, thus significantly improving the long-term storage stability of the acrylic modified starch aqueous dispersion.

In addition, the aqueous dispersion (X) has excellent properties while comprising biodegradable modified starch, and can be applied in a wide range of fields including not only coating materials but also inks, adhesives, molding agents and the like. However, it is especially useful when applied as a coating material because it can form coated films with excellent finished appearance, hardness, weather resistance, etc.

[II] In order to achieve the second object there are provided the inventions according to any one of claims 8 to 15, which include the invention of an aqueous dispersion (Y) obtained by radical polymerization reaction of a radical polymerizable unsaturated monomer mixture (d1) in the presence of a radical polymerizable unsaturated group-containing starch and/or modified starch (c) to obtain a reaction product, radical polymerization reaction of a radical polymerizable unsaturated monomer mixture (d2) in the presence of the reaction product to obtain an acrylic modified starch (C), and then dispersing the acrylic modified starch (C) in an aqueous medium, wherein the radical polymerizable unsaturated monomer mixture (d1) comprises 5-95% by mass of a carboxyl group-containing radical polymerizable unsaturated monomer and 5-95% by mass of a hydroxyl group-containing radical polymerizable unsaturated monomer, the radical polymerizable unsaturated monomer mixture (d2) comprises less than 5% by mass of a carboxyl group-containing radical polymerizable unsaturated monomer and 5-95% by mass of a hydroxyl group-containing radical polymerizable unsaturated monomer, and the acid value of the acrylic modified starch (C) is in the range of 10-150 mgKOH/g.

The aqueous dispersion (Y) is obtained by separate graft polymerization of a radical polymerizable unsaturated monomer mixture for formation of a hydrophobic polymer and a radical polymerizable unsaturated monomer mixture for formation of a hydrophilic polymer, in the presence of a radical polymerizable unsaturated group-containing starch and/or modified starch, and forming an aqueous dispersion with neutralization of the carboxyl groups in the acrylic modified starch with a basic substance if necessary. Reliably carrying out graft polymerization by the radical polymerizable unsaturated groups of the starch and/or modified starch, and forming separate hydrophobic side-chains and hydrophilic side chains by this process, presumably causes the core sections and shell sections to be clearly delineated in the particles when they are dispersed in water and results in formation of firm particles, while the particle sizes are also smaller compared to an aqueous dispersion of acrylic modified starch in which hydrophilic side chains are simply introduced into starch, thus allowing the storage stability of the acrylic modified starch aqueous dispersion for especially long periods to be significantly improved.

In addition, the aqueous dispersion (Y) has excellent properties while comprising biodegradable modified starch, and can be applied in a wide range of fields including not only coating materials but also inks, adhesives, molding agents and the like. However, it is especially useful when applied as a coating material because it can form coated films with excellent finished appearance, hardness, weather resistance, etc.

[III] In order to achieve the third object there is provided the invention according to claims 16 to 26, which include the invention of a process of forming a coating film that comprises the steps of coating a substrate with an aqueous coating composition (I) to form a base coating film, coating the base coating film with an active energy radiation curable coating composition (II), and then irradiating it with an active energy radiation, wherein the aqueous coating composition (I) is an aqueous coating composition comprising an aqueous dispersion (Z) obtained by radical polymerization reaction of a radical polymerizable unsaturated monomer mixture (f1), consisting of less than 5% by mass of a carboxyl group-containing radical polymerizable unsaturated monomer, 5-95% by mass of a hydroxyl group-containing radical polymerizable unsaturated monomer and 5-95% by mass of other radical polymerizable unsaturated monomers, in the presence of starch and/or modified starch (e) to obtain a reaction product, radical polymerization reaction of a radical polymerizable unsaturated monomer mixture (f2) consisting of 5-95% by mass of a carboxyl group-containing radical polymerizable unsaturated monomer, 5-95% by mass of a hydroxyl group-containing radical polymerizable unsaturated monomer and 0-90% by mass of other radical polymerizable unsaturated monomers, in the presence of the reaction product, to obtain an acrylic modified starch (E) with an acid value in the range of 10-150 mgKOH/g, and then dispersing the acrylic modified starch (E) in an aqueous medium, and the active energy radiation curable coating composition (II) is an active energy radiation curable coating composition comprising a saccharide and/or derivative thereof with an acryloyl group, and a photopolymerization initiator.

In the process of forming a coating film described above, an aqueous coating composition comprising a specific acrylic modified starch obtained using starch and/or modified starch as the starting material is coated onto a substrate to form a base coating film, and the base coating film is coated with an active energy radiation curable coating composition comprising a saccharide and/or derivative thereof with an acryloyl group, and subsequently irradiated with an active energy radiation. This process of forming a coating film can reduce usage of petroleum resources and reduce environmental pollution due to low total carbon dioxide output in the product life cycle, and yield multilayer coating films with excellent finished appearance, pencil hardness, mar resistance, interlayer adhesion, weather resistance, alkali resistance and solvent resistance. It can also reduce organic solvent usage since it employs an aqueous coating composition for at least part of the coating composition used.

BEST MODE FOR CARRYING OUT THE INVENTION

Preferred embodiments of the present invention will now be explained. It is to be understood, however, that the present invention is not restricted by the specific embodiments described herein.

[I]

First, the invention for the aforementioned first object will be explained.

[Aqueous Dispersion (X)]

The aqueous dispersion (X) is obtained by dispersing an acrylic modified starch (A), which is obtained by separate radical polymerization reaction of a radical polymerizable unsaturated monomer mixture (b1) for formation of a hydrophobic polymer and a radical polymerizable unsaturated monomer mixture (b2) for formation of a hydrophilic polymer, in the presence of starch and/or modified starch (a), in an aqueous medium.

The starch and/or modified starch (a) used may be one that is known in the prior art, and examples include terrestrial stem unmodified starches, such as corn starch, high amylose starch, wheat starch and rice starch, subterranean stem unmodified starches, such as potato starch and tapioca starch, and starch-substituted derivatives obtained by low-esterification, etherification, oxidation, acid treatment and dextrinization of these starches. These may be used alone or in combinations of more than one. An esterified starch, in particular, is superior for production stability of the acrylic modified starch (A), and is preferably included in an amount of at least 30% by mass, especially at least 50% by mass and more especially at least 70% by mass in component (a).

Preferred modifying groups for esterification of starch are C2-18 acyl groups. The modification may be carried out using a single C2-18 organic acid alone or a combination of two or more. The extent of modification is preferably to a degree of substitution in the range of 0.5-2.8 and especially in the range of 1.0-2.5. A degree of substitution of less than 0.5 will result in insufficient solubility with the polymerizable unsaturated monomer, leading to inadequate finished appearance of the formed coating film. On the other hand, a degree of substitution exceeding 2.8 may slow the speed of biodegradation.

The modified starch is preferably modified to a degree such that glass transition point thereof is below the decomposition temperature of starch (approximately 350° C.) and such that it is thermoplastic and biodegradable, and therefore when the number of carbons in the substituent used for modification is high it is preferably modified to a low level; for example, when the substituent is a C18 stearyl group, it is preferably modified to an ester-substitution degree in the range of 0.5-1.8, and conversely when the number of carbons in the substituent used for modification is low it is preferably modified to a high level; for example, when the substituent is a C2 acetyl group it is preferably modified to an ester-substitution degree in the range of 1.5-2.8.

As used herein, the degree of substitution is the average number of hydroxyl groups substituted by the modifying agent per monosaccharide unit of the starch, and for example, a degree of substitution of 3 means that all of the three hydroxyl groups per monosaccharide unit of the starch are substituted with the modifying agent, while a degree of substitution of 1 means that only one of the three hydroxyl groups per monosaccharide unit of the starch is substituted with the modifying agent.

The acrylic modified starch (A) can be obtained by separate radical polymerization reaction of the radical polymerizable unsaturated monomer mixture (b1) and radical polymerizable unsaturated monomer mixture (b2) in the presence of the starch and/or modified starch (a).

The carboxyl group-containing radical polymerizable unsaturated monomers used for the radical polymerizable unsaturated monomer mixture (b1) and radical polymerizable unsaturated monomer mixture (b2) may be, for example, acrylic acid, methacrylic acid, crotonic acid, itaconic acid, maleic acid, fumaric acid, 2-carboxyethyl(meth)acrylate, 2-carboxypropyl(meth)acrylate, 5-carboxypentyl(meth)acrylate or the like, and the hydroxyl group-containing radical polymerizable unsaturated monomer may be, for example, a C2-C8 hydroxyalkyl(meth)acrylate of acrylic acid or methacrylic acid, such as 2-hydroxyethyl(meth)acrylate, 3-hydroxypropyl(meth)acrylate or 4-hydroxybutyl(meth)acrylate, or (poly)ethyleneglycol mono(meth)acrylate, polypropyleneglycol mono(meth)acrylate, polybutyleneglycol mono(meth)acrylate, or a lactone-modified form of these hydroxyl group-containing radical polymerizable unsaturated monomers (the PLACCEL F Series, trade name of Dicel Chemical Industries, Ltd.).

As examples of other radical polymerizable unsaturated monomers there may also be mentioned:

C1-C18 alkyl or cycloalkyl esters of (meth)acrylic acid, such as methyl(meth)acrylate, ethyl(meth)acrylate, propyl(meth)acrylate, butyl(meth)acrylate, hexyl(meth)acrylate, octyl(meth)acrylate, lauryl(meth)acrylate and cyclohexyl (meth)acrylate;

vinyl aromatic compounds, such as styrene, α-methylstyrene, vinyltoluene, p-chlorstyrene and vinylpyridine;

nitrogen-containing radical polymerizable unsaturated monomers, such as N-(2-hydroxyethyl)(meth)acrylamide, N-(2-hydroxypropyl)(meth)acrylamide, N-(3-hydroxypropyl)(meth)acrylamide, N-methyl-N-(2-hydroxyethyl)(meth)acrylamide, N-ethyl-N-(2-hydroxyethyl)(meth)acrylamide, N-methyl-N-(2-hydroxypropyl)(meth)acrylamide, N-methyl-N-(3-hydroxypropyl)(meth)acrylamide, N-ethyl-N-(2-hydroxypropyl)(meth)acrylamide, N-ethyl-N-(3-hydroxypropyl)(meth)acrylamide, N,N-di-(2-hydroxyethyl)(meth)acrylamide and N,N-di-(2-hydroxypropyl)(meth)acrylamide;

alkoxysilyl group-containing radical polymerizable unsaturated monomers, such as vinyltrimethoxysilane, vinylmethyldimethoxysilane, vinyldimethylmethoxysilane, vinyltriethoxysilane, vinylmethyldiethoxysilane, vinyldimethylethoxysilane, vinyltripropoxysilane, vinylmethyldipropoxysilane, vinyldimethylpropoxysilane, γ-(meth)acryloyloxypropyltrimethoxysilane, γ-(meth)acryloyloxypropylmethyldimethoxysilane and γ-(meth)acryloyloxypropyldimethylmethoxysilane;

monomers having two or more radical polymerizable unsaturated bonds per molecule, such as divinylbenzene, ethyleneglycol di(meth)acrylate, diethyleneglycol di(meth)acrylate, triethyleneglycol di(meth)acrylate, tetraethyleneglycol di(meth)acrylate, 1,3-butyleneglycol di(meth)acrylate, 1,4-butanediol diacrylate, glycerin di(meth)acrylate, glycerin tri(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol penta(meth)acrylate, neopentyl glycol diacrylate, 1,6-hexanediol diacrylate, glycerolallyloxy di(meth)acrylate, 1,1,1-tris(hydroxymethyl)ethane di(meth)acrylate and 1,1,1-tris(hydroxymethyl)ethane tri(meth)acrylate; and fatty acid-modified acrylic monomers.

Production of the acrylic modified starch (A) may be accomplished by radical polymerization reaction of the radical polymerizable unsaturated monomer mixture (b1) in the presence of the starch and/or modified starch (a) to obtain a reaction product, radical polymerization reaction of the radical polymerizable unsaturated monomer mixture (b2) in the presence of the obtained reaction product, or by radical polymerization reaction of the radical polymerizable unsaturated monomer mixture (b2) to obtain a reaction product, and then radical polymerization reaction of the radical polymerizable unsaturated monomer mixture (b1) in the presence of the obtained reaction product.

The radical polymerizable unsaturated monomer mixture (b1) preferably comprises less than 5% by mass and especially less than 4% by mass of a carboxyl group-containing radical polymerizable unsaturated monomer, 5-95% by mass and especially 10-70% by mass of a hydroxyl group-containing radical polymerizable unsaturated monomer, and 5-95% by mass and especially 30-90% by mass of other radical polymerizable unsaturated monomers.

The amount of carboxyl group-containing radical polymerizable unsaturated monomer in the mixture is preferably less than 5% by mass from the viewpoint of storage stability of the aqueous dispersion (X) of the acrylic modified starch (A), and the amount of hydroxyl group-containing radical polymerizable unsaturated monomer is preferably in the range of 5-95% by mass from the viewpoint of curability, weather resistance, etc., of the obtained coated film.

On the other hand, the radical polymerizable unsaturated monomer mixture (b2) preferably comprises 5-95% by mass and especially 7-70% by mass of carboxyl group-containing radical polymerizable unsaturated monomer, 5-95% by mass and especially 10-70% by mass of hydroxyl group-containing radical polymerizable unsaturated monomer, and 0-90% by mass and especially 0-83% by mass of other radical polymerizable unsaturated monomers.

The amount of carboxyl group-containing radical polymerizable unsaturated monomer in the mixture is preferably in the range of 5-95% by mass from the viewpoint of storage stability of the aqueous dispersion (X) of the acrylic modified starch (A), and the amount of hydroxyl group-containing radical polymerizable unsaturated monomer is preferably in the range of 5-95% by mass from the viewpoint of curability, weather resistance and so on of the obtained coated film.

From the viewpoint of long-term storage stability of the aqueous dispersion (X), the content of each monomer, based on 100 parts by mass as the total of the starch and/or modified starch (a), the radical polymerizable unsaturated monomer mixture (b1) and the radical polymerizable unsaturated monomer mixture (b2), is preferably within the following ranges:

Starch and/or modified starch (a): 20-90 parts by mass,
Radical polymerizable unsaturated monomer mixture (b1): 5-40 parts by mass,
Radical polymerizable unsaturated monomer mixture (b2): 5-40 parts by mass,
and more preferably within the following ranges:
starch and/or modified starch (a): 30-80 parts by mass
Radical polymerizable unsaturated monomer mixture (b1): 10-35 parts by mass,
Radical polymerizable unsaturated monomer mixture (b2): 10-35 parts by mass.

Production of the acrylic modified starch (A) is accomplished by separate radical polymerization reaction of the radical polymerizable unsaturated monomer mixture (b1) and radical polymerizable unsaturated monomer mixture (b2) in the presence of the starch and/or modified starch (a), and the order of polymerization is preferably polymerization of (b1) followed by polymerization of (b2), rather than polymerization of (b2) followed by polymerization of (b1), because the long-term storage stability of the obtained aqueous dispersion (X) of the acrylic modified starch (A) will tend to be somewhat superior.

The reaction temperature for polymerization of the radical polymerizable unsaturated monomer mixture (b1) and radical polymerizable unsaturated monomer mixture (b2) will normally be in the range of about 60-200° C. and preferably about 70-160° C., and the reaction time will normally be up to about 10 hours and preferably about 0.5-6 hours.

A polymerization initiator is preferably added as appropriate for this reaction. Examples of such polymerization initiators include inorganic peroxide compounds, such as potassium or ammonium persulfate, hydrogen peroxide and percarbonates, organic peroxide compounds, such as acyl peroxides (for example, benzoyl peroxide), alkylhydroperoxides (for example, tertiary butylhydroperoxide and p-menthanehydroperoxide), dialkyl peroxides (for example, di-tertiary butyl peroxide) and percarbonates (for example, di-isopropylperoxy dicarbonate and t-butylperoxyisopropyl carbonate), and azo-based compounds, such as azobisisobutyronitrile. Two or more of these polymerization catalysts may also be used in admixture. There is no problem if the types and amounts of polymerization initiators differ for polymerization of the radical polymerizable unsaturated monomer mixture (b1) and polymerization of the radical polymerizable unsaturated monomer mixture (b2).

Benzoyl peroxide or t-butylperoxyisopropyl carbonate are preferably used among these polymerization initiators, from the viewpoint of the long-term storage stability of the obtained aqueous dispersion (X).

The polymerization initiator content is preferably in the range of 0.01-20 parts by mass, particularly 0.1-15 parts by mass and more particularly 0.3-10 parts by mass based on 100 parts by mass of the radical polymerizable unsaturated monomer mixture, from the viewpoint of the stability of the obtained aqueous dispersion (X).

The polymerization for production of the acrylic modified starch (A) is conducted in the presence of a common organic solvent. The organic solvent may be appropriately selected in consideration of the polymerization temperature, manageability during production of the aqueous dispersion (X), and the long-term storage stability of the obtained aqueous dispersion (X).

An organic solvent may also be added when the acrylic modified starch (A) is to be dispersed in water.

As organic solvents there are preferred alcohol-based solvents, cellosolve-based solvents, carbitol-based solvents and the like. Specific examples include alcohol-based solvents, such as n-butanol; cellosolve-based solvents, such as ethyleneglycol monobutyl ether, ethyleneglycol monoisopropyl ether, ethyleneglycol monomethyl ether and propyleneglycol monomethyl ether; and carbitol-based solvents, such as diethyleneglycol monobutyl ether and diethyleneglycol monoethyl ether. Inert organic solvents other than these organic solvents may also be used in ranges that do not impair the stability of the acrylic modified starch (A) in the aqueous medium, and as examples of such organic solvents there may be mentioned aromatic hydrocarbon-based solvents, such as toluene and xylene, esteric solvents, such as ethyl acetate and butyl acetate, and ketone-based solvents, such as methyl ethyl ketone and cyclohexanone. The amount of organic solvent in the aqueous dispersion (X) is preferably no greater than 50% by mass of the aqueous medium, from the viewpoint of environmental protection.

The acrylic modified starch (A) is produced with the composition described above, and the acid value of the obtained acrylic modified starch (A) is preferably in the range of 10-150 mgKOH/g, especially 12-120 mgKOH/g and more especially 15-90 mgKOH/g, from the viewpoint of the long-term storage stability of the obtained aqueous dispersion (X).

When the acrylic modified starch (A) is to be dispersed in water, normally some or all of the carboxyl groups of the acrylic modified starch (A) will be neutralized with a basic compound for dispersion in water. However, the acrylic modified starch (A) may also be added to water containing a basic compound.

The basic compound for neutralization may be appropriately used at 0.1-1.1 equivalents and preferably 0.5-0.9 equivalents, with respect to the carboxyl groups of the acrylic modified starch (A). Examples of basic compounds to be used for neutralization include organic amines, such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine and diethylenetriamine; or alkali metal hydroxides, such as caustic soda and caustic potash.

The aqueous dispersion (X) of the acrylic modified starch (A) may be an aqueous dispersion with a mean particle size (*1) of 0.05-1.0 μm and preferably 0.08-0.8 μm.

(*1) Mean particle size: The value obtained by diluting the sample with deionized water to a concentration appropriate for measurement, and measuring at ordinary temperature (about 20° C.) with an N4 submicron particle analyzer (trade name of Beckman Coulter, Inc., particle size distribution analyzer).

[Aqueous Coating Composition]

The aqueous dispersion (X) of the acrylic modified starch (A) may be formed into a film by application of the dispersion itself and then drying, for direct use as a coating agent. However, a coated film with excellent performance including curability, weather resistance, chemical resistance, etc., can be formed by combination with a curing agent having a group that reacts with the hydroxyl groups of the acrylic modified starch (A). The curing agent is preferably an amino resin and/or an optionally blocked polyisocyanate compound.

Melamine resins are common amino resins, and there may be mentioned methylolated melamine resins, or alkyl etherified melamine resins obtained by full etherification or partial etherification of at least some of the methylol groups of a methylolated melamine resin with a C1-10 monohydric alcohol, while melamine resins having an imino group copresent in the molecule may also be used. The number-average molecular weights of such resins may be up to 3000 and especially no greater than 1500. While water-soluble or water-dispersible agents are most suitable, water-insoluble agents may also be used.

Optionally blocked polyisocyanate compounds include both polyisocyanate compounds with free isocyanate groups and blocked polyisocyanate compounds with blocked isocyanate groups.

As examples of polyisocyanate compounds with free isocyanate groups there may be mentioned organic polyisocyanates including aliphatic diisocyanates, such as hexamethylene diisocyanate and trimethylhexamethylene diisocyanate; cyclic aliphatic diisocyanates, such as hydrogenated xylylene diisocyanate and isophorone diisocyanate; aromatic diisocyanates, such as tolylene diisocyanate and 4,4'-diphenylmethane diisocyanate; and polyisocyanate compounds with 3 or more isocyanate groups, such as triphenylmethane-4,4',4"-triisocyanate, 1,3,5-triisocyanatobenzene, 2,4,6-triisocyanatotoluene and 4,4'-dimethyldiphenylmethane-2,2',5,5'-tetraisocyanate, or addition products of these organic polyisocyanates with polyhydric alcohols, low molecular weight polyester resins or water, or cyclized polymers formed from these organic polyisocyanates, as well as isocyanate/biurets. When a polyisocyanate compound with free isocyanate groups is used, it is preferably a two-pack coating material used upon mixture with the aqueous dispersion (X) of the acrylic modified starch (A) dispersion just before coating, from the viewpoint of the storage properties and curability of the coating material.

As polyisocyanate compounds with blocked isocyanate groups there may be mentioned those obtained by blocking the isocyanate groups of polyisocyanate compounds with free isocyanate groups using known blocking agents, such as oximes, phenols, alcohols, lactams, malonic acid diesters, acetoacetic acid esters or mercaptanes.

Water-dispersible polyisocyanate compounds are preferred, and as examples there may be mentioned polyisocyanates self-emulsified in water or forcibly dispersed with a stirrer or the like, or dispersed using anionic or nonionic surfactants. As examples of commercial products there may be mentioned AQUANATE 100, AQUANATE 110, AQUANATE 200 and AQUANATE 210 (all trade names of Nippon Polyurethane Industry Co., Ltd.); BAYHYDUR TPLS-2032, SUB-ISOCYANATE L801, BAYHYDUR VPLS-2319, BAYHYDUR 3100, VPLS-2336 and VPLS-2150/1 (all trade names of Sumika Bayer Urethane Co., Ltd.); TAKENATE WD-720, TAKENATE WD-725 and TAKENATE WD-220 (all trade names of Mitsui Chemical Polyurethane Co., Ltd.); and RESAMINE D-56 (trade name of Dainichiseika Color & Chemicals Mfg. Co., Ltd.), any of which may be used alone or in combinations of two or more.

For most purposes, the aforementioned curing agents are added in ranges of about 10-50% by mass and especially 15-40% by mass, based on the total solid mass of the acrylic modified starch (A) and curing agent.

The aqueous coating composition may be a clear coating or enamel coating type, and may also contain, as appropriate, various resins (acrylic resins, urethane resins, polyolefin resins, polyester resins and the like), anti-settling agents, anti-foaming agents, thickeners, anticorrosives, ultraviolet absorbers, surface control agents, pigment dispersants, pigments (for example, color pigments, such as titanium oxide, carbon black and red iron oxide; effect pigments, such as aluminum flake or mica, extender pigments, such as clay, mica, baryta, calcium carbonate and silica; and anticorrosive pigments, such as aluminum phosphomolybdate and aluminum tripolyphosphate) and the like, depending on the required purpose. The solid content of the aqueous coating composition may be adjusted by addition of deionized water, for dilution of the coating material to a solid content of 5-70% by mass and preferably 20-60% by mass.

The aqueous coating composition may be applied to various types of substrate surfaces, and as examples of such substrates there may be mentioned inorganic substrates, such as slate boards and PC boards; organic substrates, such as plastics, and metals, such as iron and aluminum. These coating surfaces may be coated with an aqueous or solvent-based undercoat material, and if necessary coating of the undercoat material may be followed by coating of the aqueous coating composition as an overcoat material. Alternatively, coating of the aqueous coating composition as an undercoat material may be followed by coating of a known aqueous overcoat material.

As examples of methods for coating the aqueous coating composition of the invention there may be mentioned air spray coating, airless spray coating, electrostatic coating, brush coating, roller coating, lithin gun coating, universal gun coating, dipping, roll coater, curtain flow coater, roller curtain coater, die coater and the like, which may be appropriately selected according to the purpose of the substrate. The coating amount may be, for example, in the range of 10-100 μm and preferably 15-80 μm. Several coatings may also be applied so long as the coated film appearance is not impaired. Depending on the type of aqueous dispersion (X) of the acrylic modified starch (A) in the aqueous coating composition, the method of drying the formed coating film may be baking at 100-200° C. for 10-120 minutes and preferably 120-180° C. for 20-90 minutes, or forced drying at below 100° C. for 1-40 minutes, and then standing at ordinary temperature (50° C.) for at least 10 hours or ordinary temperature (50° C.) for 1-7 days, to volatilize off the water or organic solvent in the coating film and form the coating film as a continuous coating film.

[II]

The invention for the aforementioned second object will now be explained.

[Aqueous Dispersion (Y)]

The aqueous dispersion (Y) is obtained by dispersing an acrylic modified starch (C), which is obtained by separate radical polymerization reaction of a radical polymerizable unsaturated monomer mixture (d1) and a radical polymerizable unsaturated monomer mixture (d2), in the presence of a radical polymerizable unsaturated group-containing starch and/or modified starch (c), in an aqueous medium.

The radical polymerizable unsaturated group-containing starch and/or modified starch (c) has a radical polymerizable unsaturated group already introduced into starch and/or modified starch, and the starch and/or modified starch used may be one that is known in the prior art, examples of which include terrestrial stem unmodified starches, such as corn starch, high amylose starch, wheat starch and rice starch, subterranean stem unmodified starches, such as potato starch and tapioca starch, and starch-substituted derivatives obtained by low-esterification, etherification, oxidation, acid treatment and dextrinization of these starches. These may be used alone or in combinations of more than one. An esterified starch, in particular, is superior for stability of the acrylic modified starch (C) during production, and is preferably included in an amount of at least 30% by mass, especially at least 50% by mass and more especially at least 70% by mass in the starch-based component.

Preferred modifying groups for esterification of starch are C2-18 acyl groups. The modification may be carried out using a single C2-18 organic acid alone or a combination of two or more. The extent of modification is preferably to a degree of substitution in the range of 0.5-2.8 and especially in the range of 1.0-2.5. A degree of substitution of less than 0.5 will result in insufficient solubility with the polymerizable unsaturated monomer, leading to inadequate finished appearance of the formed coating film. On the other hand, a degree of substitution exceeding 2.8 may slow the speed of biodegradation.

The modified starch is preferably modified to a degree such that glass transition point thereof is below the decomposition temperature of starch (approximately 350° C.) and such that it is thermoplastic and biodegradable, and therefore when the number of carbons in the substituent used for modification is high, it is preferably modified to a low level; for example, when the substituent is a C18 stearyl group, it is preferably modified to an ester-substitution degree in the range of 0.5-1.8; conversely, when the number of carbons in the substituent used for modification is low it is preferably modified to a high level; for example, when the substituent is a C2 acetyl group it is preferably modified to an ester-substitution degree in the range of 1.5-2.8.

The method of introducing the radical polymerizable unsaturated group into the starch and/or modified starch (c) may be a conventionally known method. As examples there may be mentioned a method in which an organic carboxylic anhydride with a radical polymerizable unsaturated group (for example, acrylic anhydride, methacrylic anhydride, maleic anhydride, itaconic anhydride, citraconic anhydride, tetrahydrophthalic anhydride or octenylsuccinic anhydride) is added to the starch and/or modified starch, a method in which an organic carboxylic anhydride, such as phthalic anhydride is added to the starch and/or modified starch to introduce acid groups and then glycidyl(meth)acrylate is added, a method in which a monomer having radical polymerizable unsaturated groups and isocyanate groups is added to the starch and/or modified starch, and a method in which glycidyl(meth)acrylate is directly added to the starch and/or modified starch. An allyl group may also be introduced using the method described in Japanese Unexamined Patent Publication No. 54-8694.

Preferred is addition of a monomer with radical polymerizable unsaturated groups and isocyanate groups to the starch and/or modified starch, from the viewpoint of production stability of the acrylic modified starch (C). As examples of monomers with radical polymerizable unsaturated groups and isocyanate groups there may be mentioned 2-isocyanatoethyl(meth)acrylate. An equimolar urethanated reaction product of a diisocyanate compound and hydroxyalkyl(meth)acrylate may also be used.

Examples of diisocyanate compounds include toluilene diisocyanate, metaphenylene diisocyanate, diphenylmethane diisocyanate, isophorone diisocyanate, hexamethylene diisocyanate, xylylene diisocyanate, hydrogenated diphenylmethane diisocyanate and $\alpha,\alpha,\alpha',\alpha'$-tetramethylxylylene diisocyanate.

The content of radical polymerizable unsaturated groups in the starch and/or modified starch (c) is preferably in the range of 0.001-1.000 mmol/g and especially 0.005-0.500 mmol/g. With a low radical polymerizable unsaturated group content, it will be able to withstand storage for longer periods as the content increases. If the content is less than 0.001 mmol/g, however, there will be virtually no effect of improved long-term storage stability for the aqueous dispersion (Y), while if it exceeds 1.000 mmol/g, gelling will tend to occur more readily during polymerization of the radical polymerizable unsaturated monomer mixtures in the presence of the radical polymerizable unsaturated group-containing starch and/or modified starch (c), thus requiring greater care for polymerization.

Examples of radical polymerizable unsaturated monomers to be used for radical polymerization reaction in the presence of the radical polymerizable unsaturated group-containing starch and/or modified starch (c) include:

carboxyl group-containing polymerizable unsaturated monomers, such as acrylic acid, methacrylic acid, crotonic acid, itaconic acid, maleic acid, fumaric acid, 2-carboxyethyl (meth)acrylate, 2-carboxypropyl(meth)acrylate and 5-carboxypentyl(meth)acrylate;

hydroxyl group-containing radical polymerizable unsaturated monomers, such as C2-C8 hydroxyalkyl(meth)acrylates of acrylic acid or methacrylic acid, including 2-hydroxyethyl (meth)acrylate, 3-hydroxypropyl(meth)acrylate and 4-hydroxybutyl(meth)acrylate, (poly)ethyleneglycol mono(meth)acrylate, polypropyleneglycol mono(meth)acrylate, polybutyleneglycol mono(meth)acrylate and the like; or reaction products of these hydroxyl group-containing radical polymerizable unsaturated monomers with lactone compounds, such as β-propiolactone, dimethylpropiolactone, butyrolactone, γ-valerolactone, γ-caprolactone, γ-caprylolactone, γ-laurylolactone, ε-caprolactone and δ-caprolactone; and PLACCEL FM-1, PLACCEL FM-2, PLACCEL FM-3, PLACCEL FA-1, PLACCEL FA-2 and PLACCEL FA-3 (all trade names of Dicel Chemical Industries, Ltd., caprolactone-modified (meth)acrylic acid hydroxy esters).

C1-C18 alkyl or cycloalkyl esters of (meth)acrylic acid, such as methyl(meth)acrylate, ethyl(meth)acrylate, propyl(meth)acrylate, butyl(meth)acrylate, hexyl(meth)acrylate, octyl(meth)acrylate, lauryl(meth)acrylate, cyclohexyl(meth)acrylate and isobornyl(meth)acrylate;

vinyl aromatic compounds, such as styrene, α-methylstyrene, vinyltoluene, p-chlorstyrene and vinylpyridine;

nitrogen-containing radical polymerizable unsaturated monomers, such as N-(2-hydroxyethyl)(meth)acrylamide, N-(2-hydroxypropyl)(meth)acrylamide, N-(3-hydroxypropyl)(meth)acrylamide, N-methyl-N-(2-hydroxyethyl)(meth)acrylamide, N-ethyl-N-(2-hydroxyethyl)(meth)acrylamide, N-methyl-N-(2-hydroxypropyl)(meth)acrylamide, N-methyl-N-(3-hydroxypropyl)(meth)acrylamide, N-ethyl-N-(2-hydroxypropyl)(meth)acrylamide, N-ethyl-N-(3-hydroxypropyl)(meth)acrylamide, N,N-di-(2-hydroxyethyl)(meth)acrylamide and N,N-di-(2-hydroxypropyl)(meth)acrylamide;

alkoxysilyl group-containing radical polymerizable unsaturated monomers, such as vinyltrimethoxysilane, vinylmethyldimethoxysilane, vinyldimethylmethoxysilane, vinyltriethoxysilane, vinylmethyldiethoxysilane, vinyldimethylethoxysilane, vinyltripropoxysilane, vinylmethyldipropoxysilane, vinyldimethylpropoxysilane, γ-(meth)acryloyloxypropyltrimethoxysilane, γ-(meth)acryloyloxypropylmethyldimethoxysilane and γ-(meth)acryloyloxypropyldimethylmethoxysilane;

monomers having two or more radical polymerizable unsaturated bonds per molecule, such as divinylbenzene, ethyleneglycol di(meth)acrylate, diethyleneglycol di(meth)acrylate, triethyleneglycol di(meth)acrylate, tetraethyleneglycol di(meth)acrylate, 1,3-butyleneglycol di(meth)acrylate, 1,4-butanediol diacrylate, glycerin di(meth)acrylate, glycerin tri(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol penta(meth)acrylate, neopentyl glycol diacrylate, 1,6-hexanediol diacrylate, glycerolallyloxy di(meth)acrylate, 1,1,1-tris(hydroxymethyl) ethane di(meth)acrylate and 1,1,1-tris(hydroxymethyl) ethane tri(meth)acrylate; and fatty acid-modified acrylic monomers.

Production of the acrylic modified starch (C) may be accomplished by radical polymerization reaction of the radical polymerizable unsaturated monomer mixture (d1) in the presence of the radical polymerizable unsaturated group-containing starch and/or modified starch (c) to obtain a reaction product, radical polymerization reaction of the radical polymerizable unsaturated monomer mixture (d2) in the presence of the obtained reaction product, or by radical polymerization reaction of the radical polymerizable unsaturated monomer mixture (d2) to obtain a reaction product, and then radical polymerization reaction of the radical polymerizable unsaturated monomer mixture (d1) in the presence of the obtained reaction product.

From the viewpoint of long-term storage stability of the aqueous dispersion (Y), the content of each monomer, based on 100 parts by mass as the total of the radical polymerizable unsaturated group-containing starch and/or modified starch (c), the radical polymerizable unsaturated monomer mixture (d1) and the radical polymerizable unsaturated monomer mixture (d2), is preferably within the following ranges:

Starch and/or modified starch (c): 20-90 parts by mass,
Radical polymerizable unsaturated monomer mixture (d1): 5-40 parts by mass,
Radical polymerizable unsaturated monomer mixture (d2): 5-40 parts by mass, and more preferably within the following ranges:

starch and/or modified starch (c): 30-80 parts by mass
Radical polymerizable unsaturated monomer mixture (d1): 10-35 parts by mass,
Radical polymerizable unsaturated monomer mixture (d2): 10-35 parts by mass.

From the viewpoint of storage stability of the aqueous dispersion (Y) of the acrylic modified starch (C), the radical polymerizable unsaturated monomer mixture (d1) preferably comprises 5-95% by mass and especially 7-70% by mass of carboxyl group-containing radical polymerizable unsaturated monomer in the mixture, and from the viewpoint of curability, weather resistance and so on of the obtained coated film, it preferably comprises 5-95% by mass and especially 10-70% by mass of hydroxyl group-containing radical polymerizable unsaturated monomer.

On the other hand, from the viewpoint of storage stability of the aqueous dispersion (Y) of the acrylic modified starch (C), the radical polymerizable unsaturated monomer mixture (d2) preferably comprises less than 5% by mass and especially less than 4% by mass of carboxyl group-containing radical polymerizable unsaturated monomer in the mixture, and from the viewpoint of curability, weather resistance and so on of the obtained coated film, it preferably comprises 5-95% by mass and especially 10-70% by mass of hydroxyl group-containing radical polymerizable unsaturated monomer.

The acrylic modified starch (C) is produced with the composition described above, and the acid value of the obtained acrylic modified starch (C) is preferably in the range of 10-150 mgKOH/g, especially 12-120 mgKOH/g and more especially 15-90 mgKOH/g, from the viewpoint of the long-term storage stability of the obtained aqueous dispersion (Y).

Production of the acrylic modified starch (C) is accomplished by separate radical polymerization reaction of the radical polymerizable unsaturated monomer mixture (d1) and radical polymerizable unsaturated monomer mixture (d2) in the presence of the radical polymerizable unsaturated group-containing starch and/or modified starch (c), and the order of polymerization is preferably polymerization of (d1) followed by polymerization of (d2), rather than polymerization of (d2) followed by polymerization of (d1), because the long-term storage stability of the obtained aqueous dispersion (Y) of the acrylic modified starch (C) will tend to be somewhat superior.

The reaction temperature for polymerization of the radical polymerizable unsaturated monomer mixture (d1) and radical polymerizable unsaturated monomer mixture (d2) will normally be in the range of about 60-200° C. and preferably about 70-160° C., and the reaction time will normally be up to about 10 hours and preferably about 0.5-6 hours.

A polymerization initiator is preferably added as appropriate for this reaction. The polymerization initiator used may be the same as the polymerization initiator explained under [I] above.

The polymerization for production of the acrylic modified starch (C) is carried out in the presence of a common organic solvent, and the organic solvent used may be the same organic solvent used for production of the acrylic modified starch (A), described under [I] above.

For dispersion of the acrylic modified starch (C) in water, the organic solvent and basic compound may be used in the same manner as for the acrylic modified starch (A) explained under [I] above.

The aqueous dispersion (Y) of the acrylic modified starch (C) may be an aqueous dispersion with a mean particle size of 0.05-1.0 µm and preferably 0.08-0.8 µm.

[Aqueous Coating Composition]

The aqueous dispersion (Y) of the acrylic modified starch (C) may be formed into a film by application of the dispersion itself and then drying, for direct use as a coating agent. However, a coated film with excellent performance including curability, weather resistance, chemical resistance, etc., can be formed by combination with a curing agent having a group that reacts with the hydroxyl groups of the acrylic modified starch (C). The curing agent is preferably an amino resin and/or an optionally blocked polyisocyanate compound.

The curing agent used may be the one described for the aqueous coating composition under [I] above.

Examples of water-dispersible polyisocyanate compounds include polyisocyanates self-emulsified in water or forcibly dispersed with a stirrer or the like, or dispersed using anionic or nonionic surfactants.

The aqueous coating composition may be a clear coating or enamel coating type, and may also contain, as appropriate, various resins (acrylic resins, urethane resins, polyolefin resins, polyester resins and the like), anti-settling agents, antifoaming agents, thickeners, anticorrosives, ultraviolet absorbers, surface control agents, pigment dispersants, pigments (for example, color pigments, such as titanium oxide, carbon black and red iron oxide; effect pigments, such as aluminum flake or mica, extender pigments, such as clay, mica, baryta, calcium carbonate and silica; and anticorrosive pigments, such as aluminum phosphomolybdate and aluminum tripolyphosphate) and the like, depending on the required purpose. The solid content of the aqueous coating composition may be adjusted by addition of deionized water, for dilution of the coating material to a solid content of 5-70% by mass and preferably 20-60% by mass.

The aqueous coating composition may be applied to various types of substrate surfaces, and as examples of such substrates there may be mentioned inorganic substrates, such as slate boards and PC boards; organic substrates, such as plastics, and metals, such as iron and aluminum. These coating surfaces may be coated with an aqueous or solvent-based undercoat material, and if necessary coating of the undercoat material may be followed by coating of the aqueous coating composition as an overcoat material. Alternatively, coating of the aqueous coating composition as an undercoat material may be followed by coating of a known aqueous overcoat material.

As examples of methods for coating the aqueous coating composition of the invention there may be mentioned air spray coating, airless spray coating, electrostatic coating, brush coating, roller coating, lithin gun coating, universal gun coating, dipping, roller coater, curtain flow coater, roller curtain coater, die coater and the like, which may be appropriately selected according to the purpose of the substrate. The coating amount may be, for example, in the range of 10-100 µm and preferably 15-80 µm. Several coatings may also be applied so long as the coated film appearance is not impaired. Depending on the type of aqueous dispersion (Y) of the acrylic modified starch (C) in the aqueous coating composition, the method of drying the formed coating film may be baking at 50-200° C. for 10-120 minutes and preferably 70-180° C. for 20-90 minutes, or forced drying at below 100° C. for 1-40 minutes, and then standing at ordinary temperature (≤50° C.) for at least 10 hours or ordinary temperature (≤50° C.) for 1-7 days, to volatilize off the water or organic solvent in the coating film and form the coating film as a continuous coating film.

[III]

The invention for the aforementioned third object will now be explained.

[Substrate]

The aqueous coating composition (I) may be applied to the surfaces of different substrates, with no particular restriction on the type of substrate. The substrate may be, for example, an inorganic substrate, such as a slate board or PC board, an organic substrate, such as plastic (for example, an acrylic resin, polyester resin, polyamide resin, polycarbonate resin, ABS resin, polypropylene resin, polyethylene resin) or the like, or a metal, such as iron or aluminum. The substrate may also be coated with a primer coating material, cationic electrodeposition coating or the like, to form a preliminary primer layer and/or electrodeposition coating layer.

[Aqueous Coating Composition (I)]

The aqueous coating composition (I) contains an aqueous dispersion (Z) obtained by dispersing the acrylic modified starch (E) in an aqueous medium (hereinafter referred to simply as "aqueous dispersion (Z) of acrylic modified starch (E)).

[Aqueous Dispersion (Z) of Acrylic Modified Starch (E)]

The aqueous dispersion (Z) of the acrylic modified starch (E) is obtained by dispersing an acrylic modified starch (E), which is obtained by separate radical polymerization reaction of a radical polymerizable unsaturated monomer mixture (f1) for formation of a hydrophobic polymer and a radical polymerizable unsaturated monomer mixture (f2) for formation of a hydrophilic polymer, in the presence of starch and/or modified starch (e), in an aqueous medium.

The starch and/or modified starch (e) used may be the same as the starch and/or modified starch (a) described in [I] above.

The starch and/or modified starch (e) also preferably comprises a radical polymerizable unsaturated group, from the viewpoint of excellent long-term storage stability of the aqueous dispersion (Z) of the acrylic modified starch (E), and excellent curability of the coated film.

The method for introducing the radical polymerizable unsaturated group into the starch and/or modified starch (e) may be the same method as for the starch and/or modified starch (c) described in [II] above.

Preferred is a method of adding a monomer with radical polymerizable unsaturated groups and isocyanate groups to the starch and/or modified starch, from the viewpoint of production stability of the acrylic modified starch (E). As examples of monomers with radical polymerizable unsaturated groups and isocyanate groups there may be mentioned 2-isocyanatoethyl(meth)acrylate. An equimolar urethanated reaction product of a diisocyanate compound and hydroxyalkyl(meth)acrylate may also be used.

The diisocyanate compound used may be any of those mentioned under [II] above.

The content of radical polymerizable unsaturated groups in the radical polymerizable unsaturated group-containing starch and/or modified starch (c) is preferably in the range of 0.001-1.000 mmol/g and especially 0.005-0.500 mmol/g. With a low radical polymerizable unsaturated group content, it will be able to withstand storage for longer periods as the content increases. If content is less than 0.001 mmol/g, however, there will be virtually no effect of improved long-term storage stability for the aqueous dispersion, while if it exceeds 1.000 mmol/g, gelling will tend to occur more readily during polymerization of the radical polymerizable unsaturated monomer mixtures in the presence of the radical polymerizable unsaturated group-containing starch and/or modified starch, thus requiring greater care for polymerization.

The acrylic modified starch (E) can be obtained by separate radical polymerization reaction of the radical polymerizable unsaturated monomer mixture (f1) and radical polymerizable unsaturated monomer mixture (f2) in the presence of the starch and/or modified starch (e).

The radical polymerizable unsaturated monomers used for the radical polymerizable unsaturated monomer mixture (f1) and radical polymerizable unsaturated monomer mixture (f2) may be the radical polymerizable unsaturated monomers mentioned in [I] above.

The acrylic modified starch (E) is produced by radical polymerization reaction of the radical polymerizable unsaturated monomer mixture (f1) in the presence of the starch and/or modified starch (e) to obtain a reaction product, and then radical polymerization reaction of the radical polymerizable unsaturated monomer mixture (f2) in the presence of the obtained reaction product, or by radical polymerization reaction of the radical polymerizable unsaturated monomer mixture (f2) in the presence of the starch and/or modified starch (e) to obtain a reaction product, and then radical polymerization reaction of the radical polymerizable unsaturated monomer mixture (f1) in the presence of the obtained reaction product.

The radical polymerizable unsaturated monomer mixture (f1) preferably comprises less than 5% by mass and especially less than 4% by mass of a carboxyl group-containing radical polymerizable unsaturated monomer, 5-95% by mass and especially 10-70% by mass of a hydroxyl group-containing radical polymerizable unsaturated monomer, and 5-95% by mass and especially 30-90% by mass of other radical polymerizable unsaturated monomers.

The amount of carboxyl group-containing radical polymerizable unsaturated monomer in the radical polymerizable unsaturated monomer mixture (f1) is preferably less than 5% by mass from the viewpoint of storage stability of the aqueous dispersion (Z) of the acrylic modified starch (E), and the amount of hydroxyl group-containing radical polymerizable unsaturated monomer is preferably in the range of 5-95% by mass from the viewpoint of curability and weather resistance of the obtained coated film.

On the other hand, the radical polymerizable unsaturated monomer mixture (f2) preferably comprises 5-95% by mass and especially 7-70% by mass of carboxyl group-containing radical polymerizable unsaturated monomer, 5-95% by mass and especially 10-70% by mass of hydroxyl group-containing radical polymerizable unsaturated monomer, and 0-90% by mass and especially 0-83% by mass of other radical polymerizable unsaturated monomers.

The amount of carboxyl group-containing radical polymerizable unsaturated monomer in the radical polymerizable unsaturated monomer mixture (f2) is preferably in the range of 5-95% by mass from the viewpoint of storage stability of the aqueous dispersion (Z) of the acrylic modified starch (E), and the amount of hydroxyl group-containing radical polymerizable unsaturated monomer is preferably in the range of 5-95% by mass from the viewpoint of curability and weather resistance of the obtained coated film.

From the viewpoint of long-term storage stability of the aqueous dispersion (Z), the content of the starch and/or modified starch (e), the radical polymerizable unsaturated monomer mixture (f1) and the radical polymerizable unsaturated monomer mixture (f2), based on 100 parts by mass as the total of the starch and/or modified starch (e), the radical polymerizable unsaturated monomer mixture (f1) and the radical polymerizable unsaturated monomer mixture (f2), are preferably within the following ranges:

Starch and/or modified starch (e): 20-90 parts by mass
Radical polymerizable unsaturated monomer mixture (f1): 5-40 parts by mass,
Radical polymerizable unsaturated monomer mixture (f2): 5-40 parts by mass,
and more preferably within the following ranges:
starch and/or modified starch (e): 30-80 parts by mass
Radical polymerizable unsaturated monomer mixture (f1): 10-35 parts by mass,
Radical polymerizable unsaturated monomer mixture (f2): 10-35 parts by mass.

The reaction temperature for polymerization of the radical polymerizable unsaturated monomer mixture (f1) and radical polymerizable unsaturated monomer mixture (f2) will normally be 60-200° C. and preferably 70-160° C., and the reaction time will normally be up to about 10 hours, and preferably 0.5-6 hours.

A polymerization initiator is preferably added as appropriate for this reaction. The polymerization initiator used may be the same as the polymerization initiator explained under [I] above.

The polymerization for production of the acrylic modified starch (E) is carried out in the presence of a common organic solvent, and the organic solvent used may be the same organic solvent used for production of the acrylic modified starch (A), described under [I] above.

For dispersion of the acrylic modified starch (E) in water, the organic solvent and basic compound may be used in the same manner as for the acrylic modified starch (A) explained under [I] above.

The acid value of the acrylic modified starch (E) is preferably in the range of 10-150 mgKOH/g, especially 12-120 mgKOH/g and more especially 15-90 mgKOH/g, from the viewpoint of the long-term storage stability of the obtained aqueous dispersion (Z).

The aqueous dispersion (Z) of the acrylic modified starch (E) may be an aqueous dispersion with a mean particle size of 0.05-1.0 μm and preferably 0.08-0.8 μm.

[Aqueous Coating Composition (I)]

The aqueous dispersion (Z) of the acrylic modified starch (E) may be formed into a film by application of the dispersion itself and then drying, for direct use of the aqueous coating composition (I) as a coating agent.

The aqueous coating composition (I) may also contain a curing agent having a group that reacts with the hydroxyl groups of the acrylic modified starch (E). By combining the acrylic modified starch (E) with a curing agent having a group that reacts with the hydroxyl groups of the acrylic modified starch (E), it is possible to form a coated film with excellent performance including curability, weather resistance and chemical resistance. The curing agent is preferably an amino resin and/or an optionally blocked polyisocyanate compound.

The curing agent used may be the one described for the aqueous coating composition under [I] above.

As used herein, the number-average molecular weight and weight-average molecular weight are, respectively, the number-average molecular weight and weight-average molecular weight measured by gel permeation chromatography (using an HLC8120GPC by Tosoh Corp.), calculated based on the number-average molecular weight and weight-average molecular weight, respectively, of polystyrene. Four columns were used, namely "TSKgel G-4000H×L", "TSKgel G-3000H×L", "TSKgel G-2500H×L" and "TSKgel G-2000H×L" (all trade names of Tosoh Corp.), with the following conditions: mobile phase: tetrahydrofuran, measuring temperature: 40° C., flow rate: 1 mL/min, detector: RI.

For most purposes, the aforementioned curing agents are added in ranges of about 10-50% by mass and especially 15-40% by mass, based on the total solid mass of the acrylic modified starch (E) and curing agent.

The aqueous coating composition (I) may be a clear coating or enamel coating type, and may also contain, as appropriate, various resins (acrylic resins, urethane resins, polyolefin resins, polyester resins and the like), anti-settling agents, antifoaming agents, thickeners, anticorrosives, ultraviolet absorbers, surface control agents, pigment dispersants, pigments (for example, color pigments, such as titanium oxide, carbon black and red iron oxide; effect pigments, such as aluminum flake or mica, extender pigments, such as clay, mica, baryta, calcium carbonate and silica; and anticorrosive pigments, such as aluminum phosphomolybdate and aluminum tripolyphosphate) and the like, depending on the required purpose. The solid content of the aqueous coating composition (I) may be adjusted by addition of deionized water, for dilution of the coating material to a solid content of 5-70% by mass and preferably 10-60% by mass.

[Formation of Base Coating Film]

The base coating film is formed by coating the aqueous coating composition (I) on a substrate.

As examples of methods for coating the aqueous coating composition (I) there may be mentioned air spray coating, airless spray coating, electrostatic coating, brush coating, roller coating, lithin gun coating, universal gun coating, dipping, roller coater, curtain flow coater, roller curtain coater, die coater and the like, which may be appropriately selected according to the purpose of the substrate. The coating amount may be, for example, in the range of 0.1-30 μm and preferably 0.5-20 μm. Several coatings may also be applied so long as the base coating film appearance is not impaired. Depending on the type of aqueous dispersion (Z) of the acrylic modified starch (E) in the aqueous coating composition (I), the method of drying the formed coating film may be baking at 100-200° C. for 10-120 minutes and preferably 120-180° C. for 20-90 minutes, or forced drying at below 100° C. for 1-40 minutes, and then standing at ordinary temperature (≤50° C.) for at least 10 hours or ordinary temperature (≤50° C.) for 1-7 days. The water or organic solvent in the coating film is volatilized off to form the coating film as a continuous coating film.

[Active Energy Radiation Curable Coating Composition (II)]

The active energy radiation curable coating composition (II) comprises a saccharide and/or derivative thereof with an acryloyl group, and a photopolymerization initiator.

[Saccharide with Acryloyl Group and/or Derivative Thereof]

The saccharide and/or derivative thereof with an acryloyl group has an acryloyl group introduced into a saccharide and/or derivative thereof.

The saccharide and/or derivative thereof may be a monosaccharide, sugar alcohol, cyclic alcohol, oligosaccharide, polysaccharide, or a derivative thereof. As specific examples of sugar alcohols there may be mentioned sorbitol, dulcitol and xylitol. Inositol may be mentioned as a specific example of a cyclic alcohol. As used herein, an "oligosaccharide" is a disaccharide to decasaccharide. Oligosaccharides include cyclic oligosaccharides and acyclic oligosaccharides. As used herein, a cyclic oligosaccharide is an oligosaccharide having a structure with multiple monosaccharides bonded in a cyclic fashion with glycoside bonds. An acyclic oligosaccharide, unlike the aforementioned cyclic oligosaccharide, is an oligosaccharide having a structure with multiple monosaccharides bonded in a linear and acyclic fashion with glycoside bonds. Cyclodextrin may be mentioned specifically as a cyclic oligosaccharide. As specific examples of acyclic oligosaccharides there may be mentioned disaccharides including reducing disaccharides (maltose, cellobiose, lactose and the like) and non-reducing disaccharides (sucrose, trehalose and the like); and tri- and greater oligosaccharides, such as raffinose, panose, stachyose and dextrin. Dextrin is preferred among these because hydrolysis of starch can yield any desired molecular weight, while the non-reducing sugars sucrose and trehalose are preferred from the viewpoint of coating film durability because they do not undergo browning by Maillard reaction (browning reaction). As used herein, a polysaccharide is a sugar in which numerous monosaccharides are bonded by glycoside bonds, the number of bonded monosaccharides being greater than an oligosaccharide. As specific examples of polysaccharides there may be mentioned cellulose, chitin, starch, glycogen, agarose and pectin.

Examples of suitable compounds that may be used as saccharide derivatives include those in which a portion of the hydroxyl groups in the acyclic oligosaccharides have been carboxylic acid esterified by at least one compound selected from among C2-22 saturated carboxylic acid compounds (saturated carboxylic acids, saturated carboxylic acid esters, saturated carboxylic acid halides). Specific examples include acetic acid esters and lauric acid esters.

The method for introducing the acryloyl group into the saccharide and/or derivative thereof may be a method known in the prior art for introducing acryloyl groups into hydroxyl group-containing compounds. For example, it may be a method of adding acrylic anhydride to the saccharide and/or derivative thereof, a method of adding an organic carboxylic anhydride, such as phthalic anhydride to the saccharide and/or derivative thereof to introduce an acid group and then adding glycidyl acrylate, a method of adding a monomer with an acryloyl group and an isocyanate group to the saccharide and/or derivative thereof, or a method of adding glycidyl acrylate directly to the saccharide and/or derivative thereof.

The saccharide and/or derivative thereof with an acryloyl group may be, for example, an acrylic acid ester of a saccharide and/or derivative thereof. The acrylic acid ester of a saccharide and/or derivative thereof is an acrylic acid ester obtained by reacting the saccharide and/or derivative thereof with acrylic acid, an acrylic acid ester, such as methyl acrylate, or an acrylic acid halide, such as acrylic acid chloride. An acrylic acid ester of a saccharide and/or derivative thereof has a high proportion of saccharide-derived components in the molecule, and for this reason it is preferred to use an acrylic acid ester of a saccharide and/or derivative thereof.

Production of the acrylic acid ester of a saccharide and/or derivative thereof may be carried out by a common method and is not particularly restricted. For example, the acrylic acid ester of a saccharide and/or derivative thereof may be obtained by reacting an a saccharide and/or derivative thereof with acrylic acid or an acrylic acid ester, such as methyl acrylate. Specifically, for example, after the saccharide and/or derivative thereof has been dissolved in an organic solvent, it is subjected to esterification or transesterification reaction with the saccharide and/or derivative thereof in an amount in the range of 50-99% by mass and preferably 60-98% by mass, and the acrylic acid or acrylic acid ester, such as methyl acrylate in an amount in the range of 1-50% by mass and preferably 2-40% by mass, based on the total mass of the saccharide and/or derivative thereof and the acrylic acid or acrylic acid ester, such as methyl acrylate. The reaction may be conducted in an organic solvent, for example, a hydrocarbon-based solvent, such as toluene, xylene, cyclohexane or n-hexane; a ketone-based solvent, such as acetone, methyl ethyl ketone, methyl isobutyl ketone or methyl amyl ketone; or a mixture of the foregoing. A basic compound may be used as appropriate for the reaction. The temperature and time for the reaction are not particularly restricted, and for example, the reaction may be carried out at a temperature of 60° C.-100° C. and preferably 70-90° C. for 30 minutes to 10 hours and preferably 1-5 hours.

The amount of acryloyl groups introduced in the production of the acrylic acid ester of the saccharide and/or derivative thereof may be adjusted by the reaction temperature and reaction time during production. The average number of acryloyl groups per molecule of the acrylic acid ester of the saccharide and/or derivative that is produced can be determined by using gas chromatography to quantify the alcohol produced, in the case of transesterification, for example.

The acrylic acid ester of a saccharide and/or derivative thereof can also be obtained by dissolving the saccharide and/or derivative thereof in an organic solvent, adding an acrylic acid halide (for example, acrylic acid chloride) to neutralize the produced acid, and rinsing (dehydrochlorination).

The weight-average molecular weight of the saccharide and/or derivative thereof with an acryloyl group is preferably 400-2,000 and more preferably 500-1,800, from the viewpoint of facilitating production and from the viewpoint of the coating material viscosity and finished appearance.

The saccharide and/or derivative thereof with an acryloyl group has an average of preferably 3.0-12.0 and more preferably 4.0-9.0 acryloyl groups per molecule. This can increase the reactivity during active energy radiation exposure, and improve the mar resistance and adhesion of the obtained coating film.

The saccharide and/or derivative thereof with an acryloyl group is preferably an aqueous dispersion obtained by dispersion in an aqueous medium, from the viewpoint of reducing organic solvent usage.

There are no particular restrictions on the method for dispersing the saccharide and/or derivative thereof with an acryloyl group in an aqueous medium to prepare an aqueous dispersion. Specifically, the method of forming the aqueous dispersion may be a method of using an emulsifier for forced emulsification.

The method of using an emulsifier for forced emulsification may be, as a specific example, a method in which the saccharide and/or derivative thereof with an acryloyl group, or organic solvent solution thereof, is mixed with an emulsifier, and then water is gradually added while stirring to form an aqueous dispersion. When the saccharide and/or derivative thereof with an acryloyl group, or organic solvent solution thereof, is mixed with an emulsifier, a photopolymerization initiator described hereunder may also be combined therewith. When it is desired to reduce the particle size of the aqueous dispersion obtained by forming the aqueous dispersion, the aqueous dispersion obtained by the method described above may be further treated with a homogenizer, high-pressure emulsification device or the like. When an organic solvent solution of the saccharide and/or derivative thereof with an acryloyl group is to be used, the aqueous dispersion may be formed after removing all or part of the organic solvent, or all or part of the organic solvent may be removed after obtaining the aqueous dispersion. The amount of organic solvent in the aqueous dispersion can thus be reduced.

The emulsifier is not particularly restricted. Examples of emulsifiers include reactive emulsifiers and non-reactive emulsifiers. As examples of reactive emulsifiers there may be mentioned nonionic reactive emulsifiers, such as polyethyleneglycol mono(meth)acrylate, polyethyleneglycol di(meth)acrylate and polyoxyethylenenonylphenyl ether acrylate; anionic reactive emulsifiers with anionic groups and α,β-ethylenic double bonds, such as AQUALON HS-10 (trade name of Dai-ichi Kogyo Seiyaku Co., Ltd.), NEW FRONTIER A-229E (trade name of Dai-ichi Kogyo Seiyaku Co., Ltd.), ADEKA REASOAP SE-10N (trade name of Adeka Corp.) and sodium sulfoethylmethacrylate; anionic/nonionic reactive emulsifiers, such as ammonium salts of polyoxyethylene-1-(allyloxymethyl)alkyl ether sulfuric acid esters and ammonium salts of α-sulfo-ω-(1-(alkoxy)methyl-2-(2-propenyloxy)ethoxy)-poly(oxy-1,2-ethanediyl); cationic reactive emulsifiers with quaternary ammonium salt groups and α,β-ethylenic double bonds; reactive polymer emulsifiers, and the like.

Examples of reactive polymer emulsifiers include reactive polymer emulsifiers obtained by copolymerizing a monofunctional acrylic monomer with a hydrophilic group, such as a sulfuric acid ester, phosphoric acid ester, carboxylic acid, amino or polyethylene glycol chain group, with another copolymerizable monomer, and then introducing a double bond at the ends or on side chains. Specifically, there may be mentioned reactive polymer emulsifiers produced, for example, by polymerizing a monomer mixture comprising an epoxy group-containing unsaturated monomer, a hydroxyl group-containing unsaturated monomer and a hydrophobic unsaturated monomer to obtain an acrylic polymer, and then polymerizing a monomer mixture comprising a carboxyl group-containing unsaturated monomer, a hydroxyl group-containing unsaturated monomer and a hydrophilic unsaturated monomer, in the presence of the acrylic polymer, to obtain a graft acrylic polymer, and further adding an unsaturated monomer with an isocyanate group to the hydroxyl groups of the graft acrylic polymer.

As examples of non-reactive emulsifiers there may be mentioned anionic emulsifiers, such as sodium alkylbenzenesulfonates, sodium laurylsulfate, sodium dioctylsulfosuccinate and sodium or ammonium alkylphenylpolyoxyethylenesulfates, as well as polyoxyethylenealkylphenyl ethers, polyoxyethylenealkyl ethers, polyoxyethylene-polyoxypropylene block copolymers, and the like.

Reactive emulsifiers are preferably used among these emulsifiers from the viewpoint of water resistance.

The amount of emulsifier is not particularly restricted. However, it is preferably 0.2-20 parts by mass and more preferably 2-15 parts by mass with respect to 100 parts by mass of the saccharide and/or derivative thereof with an acryloyl group. The lower limits for these ranges are significant for obtaining a stable aqueous dispersion. The upper limits of these ranges are significant from the viewpoint of water resistance.

[Photopolymerization Initiator]

The photopolymerization initiator generates radicals upon being excited by the light energy of an active energy radiation, and it initiates radical polymerization reaction of the radical polymerizable unsaturated groups (specifically the acryloyl groups) of the saccharide and/or derivative thereof with an acryloyl group.

As specific examples for the photopolymerization initiator there may be mentioned benzoin, benzoinmethyl ether, benzoinethyl ether, benzoinisobutyl ether, diethoxyacetophenone, 2-hydroxy-2-methyl-1-phenylpropan-1-one, benzyldimethylketal, 1-hydroxycyclohexylphenylketone, 2-methyl-2-morpholino(4-thiomethylphenyl)propan-1-one, 2-benzyl-2-dimethylamino-1-(4-morpholinophenyl)-butanone, 2,4,6-trimethylbenzoylphenylphosphine oxide, 2,4,6-trimethylbenzoylphenylethoxyphosphine oxide, benzophenone, methyl o-benzoylbenzoate, hydroxybenzophenone, 2-isopropylthioxanthone, 2,4-dimethylthioxanthone, 2,4-diethylthioxanthone, 2,4-dichlorothioxanthone, 2,4,6-tris(trichloromethyl)-S-triazine, 2-methyl-4,6-bis(trichloro)-S-triazine and 2-(4-methoxyphenyl)-4,6-bis(trichloromethyl)-S-triazine. These photopolymerization initiators may be used alone or in combinations of two or more. The photopolymerization initiator is preferably a photopolymerization initiator that is liquid at ordinary temperature, such as IRGACURE 500 [trade name of Ciba Specialty Chemicals Co., Ltd., mixture of 1-hydroxycyclohexyl-phenyl-ketone and benzophenone at 1:1 (mass ratio)] or DAROCURE 1173 (trade name of Ciba Specialty Chemicals Co., Ltd., 2-hydroxy-2-methyl-1-phenyl-propan-1-one), from the viewpoint of mixing stability. The content of the photopolymerization initiator is in the range of 0.1-10 parts by mass and preferably 0.2-5 parts by mass with respect to 100 parts by mass as the total of the saccharide and/or derivative thereof with an acryloyl group and the polymerizable unsaturated compound described hereunder.

[Photosensitizer]

The active energy radiation curable coating composition (II) may be combined with a photosensitizer, in addition to the photopolymerization initiator, for the purpose of improving the sensitivity of radical generation or widening the wavelength range, in order to promote the radical polymerization reaction by irradiation with the active energy radiation.

As examples of photosensitizers to be used there may be mentioned tertiary amine-based photosensitizers, such as triethylamine, triethanolamine, methyldiethanolamine, methyl 4-dimethylaminobenzoate, ethyl 4-dimethylaminobenzoate, isoamyl 4-dimethylaminobenzoate, (2-dimethylamino)ethyl benzoate, Michler's ketone and 4,4'-diethylaminobenzophenone, alkylphosphine-based photosensitizers, such as triphenylphosphine, and thioether-based photosensitizers, such as β-thiodiglycol. These photosensitizers are preferably used in the range of 0.1-5 parts by mass with respect to 100 parts by mass as the total of the saccharide and/or derivative thereof with an acryloyl group and the polymerizable unsaturated compound described hereunder.

[Polymerizable Unsaturated Compound]

The active energy radiation curable coating composition (II) may also contain, if necessary, a polymerizable unsaturated compound other than the saccharide and/or derivative thereof with an acryloyl group.

As polymerizable unsaturated compounds there may be mentioned radical polymerizable unsaturated monomers and radical polymerizable unsaturated group-containing resins other than the saccharide and/or derivative thereof with an acryloyl group.

As radical polymerizable unsaturated monomers there may be mentioned monofunctional polymerizable unsaturated monomers, bifunctional polymerizable unsaturated monomers and trifunctional or greater polymerizable unsaturated monomers.

As monofunctional polymerizable monomers there may be mentioned styrene, methyl(meth)acrylate, ethyl(meth)acrylate, butyl(meth)acrylate, 2-ethylhexyl(meth)acrylate, lauryl (meth)acrylate, cyclohexyl(meth)acrylate, cyclohexenyl (meth)acrylate, 2-hydroxyl(meth)acrylate, hydroxypropyl (meth)acrylate, tetrahydrofurfuryl(meth)acrylate, ε-caprolactone-modified tetrahydrofurfuryl(meth)acrylate, phenoxyethyl(meth)acrylate, phenoxypolyethyleneglycol (meth)acrylate, dicyclopentenyl(meth)acrylate, dicyclopentenyloxyethyl(meth)acrylate, isobornyl(meth)acrylate, benzyl(meth)acrylate, ε-caprolactone-modified hydroxyethyl (meth)acrylate, polyethyleneglycol mono(meth)acrylate, polypropyleneglycol mono(meth)acrylate, 2-hydroxy-3-phenoxypropyl(meth)acrylate, 2-hydroxy-3-butoxypropyl (meth)acrylate, monohydroxyethyl phthalate(meth)acrylate, paracumylphenolethylene oxide-modified (meth)acrylate, N-methylol(meth)acrylamide, N-methylol(meth)acrylamide butyl ether, acryloylmorpholine, dimethylaminoethyl(meth) acrylate and N-vinyl-2-pyrrolidone.

As examples of bifunctional polymerizable monomers there may be mentioned ethyleneglycol di(meth)acrylate, diethyleneglycol di(meth)acrylate, polyethyleneglycol di(meth)acrylate, propyleneglycol di(meth)acrylate, dipropyleneglycol di(meth)acrylate, polypropyleneglycol di(meth)acrylate, neopentyl glycol di(meth)acrylate, 1,4-butanediol di(meth)acrylate, 1,6-hexanediol di(meth)acrylate, bisphenol A/ethylene oxide-modified di(meth)acrylate, bisphenol A/propylene oxide-modified di(meth)acrylate, 2-hydroxy-1-acryloxy-3-methacryloxypropane, tricyclodecanedimethanol di(meth)acrylate and di(meth)acryloyloxyethyl acid phosphate. As bifunctional polymerizable monomers there may be used monomers commercially available from Nippon Kayaku Co., Ltd. under the trade names "KAYARAD HX-220", "KAYARAD 620", "KAYARAD R-604" and "MANDA As examples of trifunctional or greater polymerizable monomers there may be mentioned trimethylolpropane tri (meth)acrylate, trimethylolpropane/ethylene oxide-modified tri(meth)acrylate, trimethylolpropane/propylene oxide-modified tri(meth)acrylate, glycerin tri(meth)acrylate, glycerin/ethylene oxide-modified tri(meth)acrylate, glycerin/propylene oxide-modified tri(meth)acrylate, pentaerythritol tri (meth)acrylate, pentaerythritol tetra(meth)acrylate, ethylene isocyanurate oxide-modified triacrylate and dipentaerythritol hexa(meth)acrylate.

Preferred radical polymerizable unsaturated monomers include bifunctional polymerizable monomers and/or trifunctional or greater polymerizable monomers, from the viewpoint of photocuring property, adhesion and mar resistance.

As examples of radical polymerizable unsaturated group-containing resins there may be mentioned unsaturated acrylic resins, unsaturated urethane resins, unsaturated epoxy resins, polyester(meth)acrylates, unsaturated silicone resins and the like, any one or more of which may selected for used. Of these, resins with radical polymerizable unsaturated groups and thermosetting functional groups are preferred and resins with two or more each of radical polymerizable unsaturated groups and the aforementioned thermosetting functional groups are more preferred, from the viewpoint of coating film curability.

The thermosetting functional groups may be functional groups, such as, for example, hydroxyl, acid, epoxy or isocyanate groups. As acid groups there may be mentioned carboxyl and phosphate groups.

As specific examples of resins having a radical polymerizable unsaturated group and a thermosetting functional group, there may be mentioned radical polymerizable unsaturated group- and epoxy group-containing acrylic resins, and radical polymerizable unsaturated group- and isocyanate group-containing acrylic resins.

When the polymerizable unsaturated compound has a thermosetting functional group, an amino resin, polyisocyanate compound or epoxy group-containing compound, for example, is preferably used therewith from the viewpoint of improving the coating film hardness.

Examples of amino resins to be used include melamine resins, guanamine resins and urea resins.

The mixing proportion of the polymerizable unsaturated compound with respect to the saccharide and/or derivative thereof with an acryloyl group is 0-900 parts by mass and preferably 30-400 parts by mass of the polymerizable unsaturated compound with respect to 100 parts by mass of the saccharide and/or derivative thereof with an acryloyl group, from the viewpoint of finished appearance and mar resistance.

The active energy radiation curable coating composition (II) may also employ, as necessary, delustering agents, surface control agents, ultraviolet absorbers, light stabilizers, antifoaming agents, organic coloring agents, natural pigments, inorganic pigments and the like.

The active energy radiation curable coating composition (II) may be a solvent-type or aqueous-type. The active energy radiation curable coating composition (II) is preferably aqueous, i.e. an active energy radiation curable aqueous coating composition, from the viewpoint of reducing the amount of organic solvent usage. The method for obtaining an aqueous form for production of an active energy radiation curable aqueous coating composition is not particularly restricted. The method for obtaining the aqueous composition may be, for example, a method in which the saccharide and/or derivative thereof with an acryloyl group, or organic solvent solution thereof, is mixed with the photopolymerization initiator and an emulsifier, and then water is gradually added while stirring to obtain an aqueous dispersion. Another method is one in which an aqueous dispersion of the saccharide and/or derivative thereof with an acryloyl group is obtained first, and the other components, such as the photopolymerization initiator are mixed in the aqueous medium by a common method. When a polymerizable unsaturated compound is used, preferably the compound is first prepared as an aqueous dispersion and the obtained aqueous dispersion is used, from the viewpoint of mixing stability. The method for obtaining an aqueous dispersion of the polymerizable unsaturated compound may be the same method as for obtaining an aqueous dispersion of the saccharide and/or derivative thereof with an acryloyl group. When the photopolymerization initiator is a solid photopolymerization initiator with low solubility in water, it is preferably added to the polymerizable unsaturated compound and dissolved, from the viewpoint of allowing more uniform photocuring and from the viewpoint of finished appearance and mar resistance.

[Step of Coating Active Energy Radiation Curable Coating Composition (II), and Step of Irradiating it with Active Energy Radiation]

The coating method used for coating of the active energy radiation curable coating composition (II) may be a conventionally known coating method. As examples there may be mentioned air spray coating, airless spray coating, electrostatic coating, brush coating, roller coating, lithin gun coating, universal gun coating, dipping, roll coater, curtain flow coater, roller curtain coater, die coater and the like. Air spray coating is preferred among these.

The film thickness of the coating film formed by the aforementioned application is not particularly restricted. However, the thickness will usually be 0.1-30 µm, preferably 1-25 µm and more preferably 5-20 µm as the dry film thickness.

The solid concentration of the active energy radiation curable coating composition (II) is not particularly restricted so long as it is in a range that allows coating, however, preferably it is in the range of 10-50% by mass for air spray coating.

After the active energy radiation curable coating composition (II) has been applied, it is preferably heated or set to volatilize off the solvent, such as water, and then irradiated with an active energy radiation. The means for heating is not particularly restricted, and for example, drying equipment, such as an air heating furnace, electric furnace or infrared ray induction heating may be employed. The heating temperature is not particularly restricted, but is normally in the range of 35-100° C. and preferably 40-90° C. Although the heating time is not especially restricted, it will usually be in the range of 1-30 minutes.

The irradiated active energy radiation is not particularly restricted and may be an electron radiation, ultraviolet rays, visible light or infrared rays. The wavelength of the active energy radiation is preferably a wavelength of 200-600 nm and more preferably a wavelength of 300-450 nm, from the viewpoint of finished appearance, for example.

An irradiation source with a high-sensitivity wavelength may be appropriately selected as the active energy radiation irradiation source, depending on the type of photopolymerization initiator. As examples of active energy radiation irradiation sources there may be mentioned a high-pressure mercury lamp, ultra-high-pressure mercury lamp, xenon lamp, carbon arc lamp or metal halide lamp, or sunlight.

The suitable conditions for irradiation of the active energy radiation will usually be a cumulative dose of 1,000-50,000 J/m² and preferably 2,000-30,000 J/m². The coating film can be cured with an exposure time of between 1 second and 5 minutes. This range is preferred from the viewpoint of the photocuring property and yellowing resistance of the coating film.

The active energy radiation curable coating composition (II) may be subjected to heating as supplementary crosslinking means either after or simultaneously with irradiation of the active energy radiation.

The coated article obtained by the process of forming a coating film described above may be used as a material or part in, for example, an electrical component, cellular phone, illumination device, electrical element, semiconductor, automatic vending machine or the like.

EXAMPLES

The present invention will now be explained in greater detail using examples and comparative examples. The "parts" and "%" values are all based on mass.

Examples [I]

First, examples of the invention for the aforementioned first object will be explained.
[Production of Modified Starch]

Production Example X-1

After suspending 25 parts of high amylose corn starch (product of Nihon Cornstarch Corp., hydroxyl value: 500 mgKOH/g) in 200 parts of dimethyl sulfoxide (DMSO), the mixture was heated to 90° C. while stirring and held at that temperature for 20 minutes for gelatinization. Next, 20 parts of sodium bicarbonate was added as a catalyst to the solution, and 17 parts of vinyl laurate was added while keeping the temperature at 90° C., prior to 1 hour of reaction at that temperature. Next, 37 parts of vinyl acetate was further added and reaction was continued at 80° C. for 1 hour. The reaction mixture was then poured into tap water, and the mixture was stirred at high speed for disintegration and then filtered and dewatered to obtained esterified starch X-P1.

[Aqueous Dispersion (X) of Acrylic Modified Starch (A)]

Example X-1

In a four-necked glass flask equipped with a thermometer, stirrer, reflux condenser, water separator and nitrogen inlet there was placed 50 parts of ethyleneglycol monobutyl ether, the mixture was heated to 50° C. under a nitrogen stream while stirring, and upon reaching 50° C., 60 parts of the esterified starch X-P1 obtained in Production Example X-1 was added and the resulting mixture was heated to 120° C. while stirring. After dissolution of the esterified starch, a mixture of 10 parts methyl methacrylate, 5 parts n-butyl acrylate, 5 parts 2-hydroxyethyl methacrylate and 1 part benzoyl peroxide was added dropwise at 120° C. over a period of 1 hour, and upon completion of the dropwise addition the mixture was kept at 120° C. for 1 hour to obtain a reaction product.

Next, a mixture of 10 parts methyl methacrylate, 1 part n-butyl acrylate, 5 parts 2-hydroxyethyl methacrylate, 4 parts acrylic acid and 1 part benzoyl peroxide was added dropwise to the flask at 120° C. over a period of 1 hour, and upon completion of the dropwise addition the mixture was kept at 120° C. for 1 hour to obtain an acrylic-modified esterified starch solution.

The acrylic-modified esterified starch solution was cooled to 90° C., and then 4.45 parts of dimethylethanolamine was added and the mixture was stirred for 15 minutes. Next, 179 parts of deionized water was added dropwise over a period of 1 hour while stirring, to obtain an aqueous dispersion of an acrylic modified starch with a resin solid content of 30%, a resin acid value of 37 mgKOH/g and a mean particle size of 0.29 μm.

Examples X-2 to X-9 and Comparative Examples X-2 and X-3

Acrylic modified starch aqueous dispersions were obtained in the same manner as Example X-1, except that the starting materials, contents and reaction temperature in Example X-1 were as listed in Table X-1.

Comparative Example X-1

In a four-necked glass flask equipped with a thermometer, stirrer, reflux condenser, water separator and nitrogen inlet there was placed 50 parts of ethyleneglycol monobutyl ether, the mixture was heated to 50° C. under a nitrogen stream while stirring, and upon reaching 50° C., 60 parts of the 30% esterified starch solution X-P1 was added and the resulting mixture was heated to 120° C. while stirring. After the esterified starch had dissolved, a mixture of 20 parts methyl methacrylate, 6 parts n-butyl acrylate, 10 parts 2-hydroxyethyl methacrylate, 4 parts acrylic acid and 2 parts benzoyl peroxide was added dropwise to the flask at 120° C. over a period of 1 hour, and upon completion of the dropwise addition the mixture was kept at 120° C. for 1 hour to obtain an acrylic-modified esterified starch solution. The acrylic-modified esterified starch solution was cooled to 90° C., and then 4.45 parts of dimethylethanolamine was added and the mixture was stirred for 15 minutes. Next, 179 parts of deionized water was added dropwise over a period of 1 hour while stirring, to obtain acrylic modified starch aqueous dispersion No. X-10 with a resin solid content of 30%, a resin acid value of 37 mgKOH/g and a mean particle size of 1.30 μm.

[Storage Stability]

The acrylic modified starch aqueous dispersions obtained in the manner described above were subjected to storage stability testing by the following test method. The results are shown in Table X-1.

Storage stability: An 800 g portion of each aqueous dispersion was placed in an approximately 1 L-volume glass bottle and stored for 60 days in a thermostatic chamber at 40° C. It was then returned to room temperature and the condition in the container was visually observed and evaluated on the following scale.

Good (G): No deposition or notable viscosity changes observed.

Poor (P): Deposition and/or notable viscosity changes observed.

TABLE X-1

| | | Example NO. | | | | | |
|---|---|---|---|---|---|---|---|
| | | X-1 | X-2 | X-3 | X-4 | X-5 | X-6 |
| Acrylic-modified starch aqueous dispersion NO. | | X-1 | X-2 | X-3 | X-4 | X-5 | X-6 |
| Ethyleneglycol monobutyl ether | | 50 | 50 | 50 | 50 | 50 | 50 |
| Esterified starch X-P1 | | 60 | 80 | 30 | 80 | 30 | 60 |
| Acrylic portion Stage 1 Polymerization initiator | Methyl methacrylate | 10 | 5 | 17.5 | 5 | 17.5 | 15 |
| | N-Butyl acrylate | 5 | 2.5 | 8.75 | 2.1 | 8.75 | 7.5 |
| | 2-Hydroxyethyl methacrylate | 5 | 2.5 | 8.75 | 2.5 | 8.75 | 7.5 |
| | Acrylic acid | 0 | 0 | 0 | 0.4 | 0 | 0 |
| | Benzoyl peroxide | 1 | 0.5 | 1.75 | 0.5 | 1.75 | 1.5 |
| Acrylic portion Stage 2 Polymerization initiator | Methyl methacrylate | 10 | 0.5 | 17.5 | 2 | 7 | 0.5 |
| | N-Butyl acrylate | 1 | 0.5 | 5.95 | 2.5 | 8.75 | 0.5 |
| | 2-Hydroxyethyl methacrylate | 5 | 2 | 8.75 | 2.5 | 8.75 | 6 |
| | Acrylic acid | 4 | 7 | 2.8 | 3 | 10.5 | 3 |
| | Benzoyl peroxide | 1 | 0.5 | 1.75 | 0.5 | 1.75 | 0.5 |
| Neutralizer | Dimethylethanolamine | 4.45 | 5.19 | 3.12 | 3.78 | 5.19 | 3.33 |
| Dilution | Deionized water | 179 | 178 | 180 | 180 | 178 | 180 |

TABLE X-1-continued

| Property values | Resin solid content (%) | 30 | 30 | 30 | 30 | 30 | 30 |
|---|---|---|---|---|---|---|---|
| | Resin acid value (MGKOH/G) | 37 | 58 | 35 | 30 | 95 | 31 |
| | Mean particle size (μM) | 0.29 | 0.26 | 0.3 | 0.32 | 0.23 | 0.32 |
| | Storage stability | G | G | G | G | G | G |

| | | Example NO. | | | Comp. Example NO. | | |
|---|---|---|---|---|---|---|---|
| | | X-7 | X-8 | X-9 | X-1 | X-2 | X-3 |
| Acrylic-modified starch aqueous dispersion NO. | | X-7 | X-8 | X-9 | X-10 | X-11 | X-12 |
| Ethyleneglycol monobutyl ether | | 50 | 50 | 50 | 50 | 50 | 50 |
| Esterified starch X-P1 | | 60 | 60 | 60 | 60 | 60 | 60 |
| Acrylic portion Stage 1 Polymerization initiator | Methyl methacrylate | 15 | 2 | 5 | 20 | 10.5 | 15 |
| | N-Butyl acrylate | 7.5 | 2 | 4.5 | 6 | 10.2 | 7.5 |
| | 2-Hydroxyethyl methacrylate | 7.5 | 6 | 0.5 | 10 | 7.5 | 7.5 |
| | Acrylic acid | 0 | 0 | 0 | 4 | 1.8 | 0 |
| | Benzoyl peroxide | 1.5 | 0.5 | 0.5 | 2 | 1.5 | 1.5 |
| Acrylic portion Stage 2 Polymerization initiator | Methyl methacrylate | 3.5 | 9 | 9 | — | 3 | 3.5 |
| | N-Butyl acrylate | 3 | 9 | 9 | — | 0.5 | 3.6 |
| | 2-Hydroxyethyl methacrylate | 0.5 | 7.5 | 7.5 | — | 2.5 | 2.5 |
| | Acrylic acid | 3 | 4.5 | 4.5 | — | 4 | 0.4 |
| | Benzoyl peroxide | 0.5 | 1.5 | 1.5 | — | 0.5 | 0.5 |
| Neutralizer | Dimethylethanolamine | 3.33 | 5.01 | 5.01 | 4.45 | 6.45 | 3.11 |
| Dilution | Deionized water | 180 | 178 | 178 | 179 | 178 | 180 |
| Property values | Resin solid content (%) | 30 | 30 | 30 | 30 | 30 | —* |
| | Resin acid value (MGKOH/G) | 31 | 43 | 43 | 37 | 53 | |
| | Mean particle size (μM) | 0.35 | 0.27 | 0.27 | 4.0 | 4.5 | |
| | Storage stability | G | G | G | P | P | — |

*indispersible

[Production of Aqueous Coating Composition]

Example X-10

After placing 227 parts (solid content: 68 parts) of acrylic modified starch aqueous dispersion No. X-1 obtained in Example X-1, 32 parts of BAYHYDUR VPLS-2319 (product of Sumika Bayer Urethane Co., Ltd., hexamethylene diisocyanate-based water-dispersible polyisocyanate compound, solid content: 100%) and 27 parts of deionized water in a container, the components were mixed while stirring to obtain aqueous coating composition X-B1 with a solid content of 35%.

Examples X-11 to X-18 and Comparative Examples X-4 and X-5

Aqueous coating compositions No. X-B2 to No. X-B11 were obtained in the same manner as Example X-10, except that the composition in Example X-10 was changed as listed in table X-2.

[Preparation and Evaluation of Test Sheets]

Each aqueous coating composition obtained as described above was spray coated onto a polypropylene board to a dry film thickness of 50 μm. An electric hot air dryer was then used for drying at 80° C. for 30 minutes, and the test coated board obtained after standing for 1 day was used for the following test.

[Finished Appearance]

The surface condition of each test coated board was visually examined and evaluated as follows.

Good (G): Satisfactory smoothness without problems.

Fair (F): At least one problem noted from among swelling, dulling and flaking, creating problems.

Poor (P): At least one significant problem noted from among swelling, dulling and flaking, creating problems.

[Non-Tackiness of Coating Film]

The surface of each test coated board was pressed with a fingertip (so that the fingernail touched the coating surface), and the degree of tackiness and fingernail mark on the coating film were evaluated as follows.

Very good (VG): No tackiness, no fingernail mark.
Good (G): No tackiness, slight fingernail mark.
Fair (F): Some tackiness, but no fingerprint mark.
Poor (P): Tackiness and fingerprint mark observed.

[Gel Fraction (%)]

The coating film on the polypropylene board was released for use as a free film, and the film was placed in a separate-type round bottom flask and heated after addition of 100 g of acetone to 1 g of the film, for 3 hours of reflux. The film was then removed out and dried at 105° C. for 1 hour, and the film mass measured before and after reflux was applied for calculation by the following formula.

Gel fraction (%)=100×mass of film after reflux/mass of film before reflux.

TABLE X-2

| | | Example NO. | | | | | | | | | Comp. Ex. NO. | |
|---|---|---|---|---|---|---|---|---|---|---|---|---|
| | | X-10 | X-11 | X-12 | X-13 | X-14 | X-15 | X-16 | X-17 | X-18 | X-4 | X-5 |
| Aqueous coating composition NO. | | X-B1 | X-B2 | X-B3 | X-B4 | X-B5 | X-B6 | X-B7 | X-B8 | X-B9 | X-B10 | X-B11 |

TABLE X-2-continued

| | | Example NO. | | | | | | | | | Comp. Ex. NO. | |
|---|---|---|---|---|---|---|---|---|---|---|---|---|
| | | X-10 | X-11 | X-12 | X-13 | X-14 | X-15 | X-16 | X-17 | X-18 | X-4 | X-5 |
| Acrylic-modified starch aqueous dispersion NO. | X-1 | 227 | | | | | | | | | | |
| | X-2 | | 227 | | | | | | | | | |
| | X-3 | | | 227 | | | | | | | | |
| | X-4 | | | | 227 | | | | | | | |
| | X-5 | | | | | 227 | | | | | | |
| | X-6 | | | | | | 220 | | | | | |
| | X-7 | | | | | | | 233 | | | | |
| | X-8 | | | | | | | | 220 | | | |
| | X-9 | | | | | | | | | 233 | | |
| | X-10 | | | | | | | | | | 227 | |
| | X-11 | | | | | | | | | | | 227 |
| BAYHYDUR VPLS-2319 | | 32 | 32 | 32 | 32 | 32 | 34 | 30 | 34 | 30 | 32 | 32 |
| Deionized water | | 27 | 27 | 27 | 27 | 27 | 32 | 23 | 32 | 23 | 27 | 27 |
| Finished appearance | | G | G | G | G | G | G | G | G | G | F | F |
| Non-tackiness of coating film | | G | G | G | G | G | G | G | G | G | G | G |
| Gel fraction (%) | | 87 | 88 | 91 | 88 | 91 | 85 | 85 | 85 | 85 | 85 | 85 |

Examples [II]

Examples of the invention for the aforementioned second object will now be explained.
[Production of Modified Starch]

Production Example Y-1

After suspending 25 parts of high amylose corn starch (product of Nihon Cornstarch Corp., hydroxyl value: 500 mgKOH/g) in 200 parts of dimethyl sulfoxide (DMSO), the mixture was heated to 90° C. while stirring and then held at that temperature for 20 minutes for gelatinization. Next, 20 parts of sodium bicarbonate was added as a catalyst to the solution, and 17 parts of vinyl laurate was added while keeping the temperature at 90° C., prior to 1 hour of reaction at that temperature. Following this, 37 parts of vinyl acetate was further added and reaction was continued at 80° C. for 1 hour. The reaction mixture was then poured into tap water, and the mixture was stirred at high speed for disintegration and then filtered and dewatered to obtained esterified starch Y-P1.
[Aqueous Dispersion (Y) of Acrylic Modified Starch (C)]

Example Y-1

In a four-necked glass flask equipped with a thermometer, stirrer, reflux condenser, water separator and nitrogen inlet there was placed 140 parts of toluene, and the mixture was heated to 50° C. under a nitrogen stream while stirring. After a temperature of 50° C. was reached, 70 parts of the esterified starch Y-P1 obtained in Production Example Y-1 was added, the temperature was increased to near 110° C. while stirring, and then toluene was passed through a water separator for water separation for approximately 30 minutes under reflux. After water separation, 0.3 part of 2-isocyanatoethyl acrylate and a trace amount (approximately 0.0004 part) of dibutyltin dilaurate were added while maintaining a temperature of 105° C. for approximately 2 hours of reaction, to obtain a radical polymerizable unsaturated group-containing esterified starch solution.

After then adding 50 parts of ethyleneglycol monobutyl ether to the radical polymerizable unsaturated group-containing esterified starch solution, the temperature was raised to 105° C., the toluene was recovered under reduced pressure, and the solvent in the system was exchanged from toluene to ethyleneglycol monobutyl ether.

The radical polymerizable unsaturated group content of the radical polymerizable unsaturated group-containing esterified starch was 0.030 mmol/g.

The radical polymerizable unsaturated group-containing esterified starch solution that had been solvent-exchanged with ethyleneglycol monobutyl ether was then heated to 120° C., and a mixture of 9.2 parts methyl methacrylate, 2.2 parts n-butyl acrylate, 4.6 parts 2-hydroxyethyl methacrylate, 4.0 parts acrylic acid and 1.00 part benzoyl peroxide was added dropwise over a period of 1 hour while maintaining the same temperature, and upon completion of the dropwise addition the mixture was kept at 120° C. for 1 hour.

Next, a mixture of 4.6 parts methyl methacrylate, 3.1 parts n-butyl acrylate, 2.3 parts 2-hydroxyethyl methacrylate and 0.50 part benzoyl peroxide was added dropwise into the flask over a period of 1 hour while maintaining the temperature of 120° C., and upon completion of the dropwise addition the mixture was kept at 120° C. for 1 hour to obtain an acrylic-modified esterified starch solution.

The acrylic-modified esterified starch solution was cooled to 60° C., and then 4.94 parts of dimethylethanolamine was added and the mixture was stirred for 15 minutes. Next, 178 parts of deionized water was added dropwise over a period of 1 hour while stirring, to obtain aqueous dispersion (Y) No. Y-1 of an acrylic modified starch (C) with a resin solid content of 30%, a resin acid value of 34 mgKOH/g and a mean particle size of 0.22 μm.

Examples Y-2 to Y-11

The aqueous dispersion (Y) of each acrylic modified starch (C) was obtained in the same manner as Example Y-1, except that the starting materials, contents and reaction temperature in Example Y-1 were as listed in Table Y-1.

Comparative Example Y-1

In a four-necked glass flask equipped with a thermometer, stirrer, reflux condenser, water separator and nitrogen inlet there was placed 160 parts of toluene, and the mixture was heated to 50° C. under a nitrogen stream while stirring. After a temperature of 50° C. was reached, 80 parts of the esterified starch Y-P1 obtained in Production Example Y-1 was added, the temperature was increased to near 110° C. while stirring, and then toluene was passed through a water separator for water separation for approximately 30 minutes under reflux. After water separation, 0.3 part of 2-isocyanatoethyl acrylate and a trace amount (approximately 0.0004 part) of dibutyltin dilaurate were added while maintaining a temperature of 105° C. for approximately 2 hours of reaction, to obtain a radical polymerizable unsaturated group-containing esterified starch solution.

The radical polymerizable unsaturated group content of the radical polymerizable unsaturated group-containing esterified starch was 0.027 mmol/g.

After then adding 50 parts of ethyleneglycol monobutyl ether to the radical polymerizable unsaturated group-containing esterified starch solution, the temperature was raised to 105° C., the toluene was recovered under reduced pressure, and the solvent in the system was exchanged from toluene to ethyleneglycol monobutyl ether.

The radical polymerizable unsaturated group-containing esterified starch solution that had been solvent-exchanged with ethyleneglycol monobutyl ether was then heated to 120° C., and a mixture of 9.2 parts methyl methacrylate, 2.2 parts n-butyl acrylate, 4.6 parts 2-hydroxyethyl methacrylate, 4.0 parts acrylic acid and 1.00 part benzoyl peroxide was added dropwise over a period of 1 hour while maintaining the same temperature, and upon completion of the dropwise addition the mixture was kept at 120° C. for 1 hour, to obtain an acrylic-modified esterified starch solution.

The acrylic-modified esterified starch solution was cooled to 60° C., and then 4.94 parts of dimethylethanolamine was added and the mixture was stirred for 15 minutes. Next, 178 parts of deionized water was added dropwise over a period of 1 hour while stirring, to obtain acrylic modified starch aqueous dispersion No. Y-12 with a resin solid content of 30%, a resin acid value of 34 mgKOH/g and a mean particle size of 0.52 µm.

Comparative Example Y-2

In a four-necked glass flask equipped with a thermometer, stirrer, reflux condenser, water separator and nitrogen inlet there was placed 50 parts of ethyleneglycol monobutyl ether, and the mixture was heated to 50° C. under a nitrogen stream while stirring. After a temperature of 50° C. was reached, 70 parts of the esterified starch Y-P1 obtained in Production Example Y-1 was added, the temperature was increased to near 120° C. while stirring. Next, while maintaining this temperature, a mixture of 9.2 parts methyl methacrylate, 2.2 parts n-butyl acrylate, 4.6 parts 2-hydroxyethyl methacrylate, 4.0 parts acrylic acid and 1.00 part benzoyl peroxide was added dropwise over a period of 1 hour, and upon completion of the dropwise addition the mixture was kept at 120° C. for 1 hour.

Next, a mixture of 4.6 parts methyl methacrylate, 3.1 parts n-butyl acrylate, 2.3 parts 2-hydroxyethyl methacrylate and 0.50 part benzoyl peroxide was added dropwise into the flask over a period of 1 hour while maintaining the temperature of 120° C., and upon completion of the dropwise addition the mixture was kept at 120° C. for 1 hour to obtain an acrylic-modified esterified starch solution.

The acrylic-modified esterified starch solution was cooled to 60° C., and then 4.94 parts of dimethylethanolamine was added and the mixture was stirred for 15 minutes. Next, 178 parts of deionized water was added dropwise over a period of 1 hour while stirring, to obtain acrylic modified starch aqueous dispersion No. Y-13 with a resin solid content of 30%, a resin acid value of 34 mgKOH/g and a mean particle size of 0.38 µm.

[Storage Stability]

The acrylic modified starch aqueous dispersions obtained in the examples and comparative examples were subjected to storage stability testing by the following test method. The results are shown in Table Y-1.

Storage stability: An 800 g portion of each aqueous dispersion was placed in an approximately 1 L-volume glass bottle and stored for 120 days in a thermostatic chamber at 40° C. It was then returned to room temperature and the condition in the container was visually observed and evaluated on the following scale.

Good (G): No deposition or notable viscosity changes observed.

Poor (P): Deposition and/or notable viscosity changes observed.

TABLE Y-1

|  |  | Example NO. | | | | | | |
|---|---|---|---|---|---|---|---|---|
|  |  | Y-1 | Y-2 | Y-3 | Y-4 | Y-5 | Y-6 | Y-7 |
| Acrylic-modified starch aqueous dispersion NO. | | Y-1 | Y-2 | Y-3 | Y-4 | Y-5 | Y-6 | Y-7 |
| Toluene | | 140.0 | 140.0 | 140.0 | 160.0 | 60.0 | 160.0 | 60.0 |
| Esterified starch Y-P1 | | 70.0 | 70.0 | 70.0 | 80.0 | 30.0 | 80.0 | 30.0 |
| 2-Isocyanatoethyl acrylate | | 0.30 | 0.30 | 0.10 | 0.10 | 0.10 | 0.10 | 0.10 |
| Dibutyltin dilaurate | | trace | trace | trace | trace | trace | trace | trace |
| Ethyleneglycol monobutyl ether | | 50.0 | 50.0 | 50.0 | 50.0 | 50.0 | 50.0 | 50.0 |
| Radical-polymerizable unsaturated group content (MMOL/G) | | 0.030 | 0.030 | 0.010 | 0.009 | 0.024 | 0.009 | 0.024 |
| Acrylic portion Stage 1 Polymerization initiator | Methyl methacrylate | 9.2 | 4.6 | 9.2 | 0.5 | 17.5 | 2.0 | 7.0 |
| | N-Butyl acrylate | 2.2 | 3.1 | 3.2 | 0.5 | 6.0 | 2.5 | 8.8 |
| | 2-Hydroxyethyl methacrylate | 4.6 | 2.3 | 4.6 | 2.0 | 8.8 | 2.5 | 8.8 |
| | Acrylic acid | 4.0 | 0 | 3.0 | 7.0 | 2.8 | 3.0 | 10.5 |
| | Benzoyl peroxide | 1.00 | 0.50 | 1.00 | 0.50 | 1.75 | 0.50 | 1.75 |
| Acrylic portion Stage 2 Polymerization initiator | Methyl methacrylate | 4.6 | 9.2 | 4.6 | 5.0 | 17.5 | 5.0 | 17.5 |
| | N-Butyl acrylate | 3.1 | 2.2 | 3.1 | 2.5 | 8.8 | 2.1 | 8.8 |
| | 2-Hydroxyethyl methacrylate | 2.3 | 4.6 | 2.3 | 2.5 | 8.8 | 2.5 | 8.8 |
| | Acrylic acid | 0 | 4.0 | 0 | 0 | 0 | 0.4 | 0 |
| | Benzoyl peroxide | 0.50 | 1.00 | 0.50 | 0.50 | 1.75 | 0.50 | 1.75 |
| Neutralizer | Dimethylethanolamine | 4.94 | 4.94 | 3.71 | 5.19 | 3.12 | 3.78 | 5.19 |
| Dilution | Deionized water | 178 | 178 | 180 | 178 | 180 | 180 | 178 |

TABLE Y-1-continued

| Property values | Resin solid content (%) | 30 | 30 | 30 | 30 | 30 | 30 | 30 |
| --- | --- | --- | --- | --- | --- | --- | --- | --- |
| | Resin acid value (MGKOH/G) | 34 | 34 | 27 | 58 | 35 | 30 | 95 |
| | Mean particle size (μM) | 0.22 | 0.28 | 0.28 | 0.21 | 0.24 | 0.26 | 0.18 |
| Storage stability | (40° C. × 120 days) | G | G | G | G | G | G | G |

| | | Example NO. | | | | Comp. Ex. NO. | |
| --- | --- | --- | --- | --- | --- | --- | --- |
| | | Y-8 | Y-9 | Y-10 | Y-11 | Y-1 | Y-2 |
| Acrylic-modified starch aqueous dispersion NO. | | Y-8 | Y-9 | Y-10 | Y-11 | Y-12 | Y-13 |
| Toluene | | 120.0 | 120.0 | 120.0 | 120.0 | 160.0 | 140.0 |
| Esterified starch Y-P1 | | 60.0 | 60.0 | 60.0 | 60.0 | 80.0 | 70.0 |
| 2-Isocyanatoethyl acrylate | | 0.10 | 0.10 | 0.10 | 0.10 | 0.30 | — |
| Dibutyltin dilaurate | | trace | trace | trace | trace | trace | — |
| Ethyleneglycol monobutyl ether | | 50.0 | 50.0 | 50.0 | 50.0 | 50.0 | 50.0 |
| Radical-polymerizable unsaturated group content (MMOL/G) | | 0.012 | 0.012 | 0.012 | 0.012 | 0.027 | — |
| Acrylic portion Stage 1 Polymerization | Methyl methacrylate | 0.5 | 3.5 | 9.0 | 9.0 | 9.2 | 9.2 |
| | N-Butyl acrylate | 0.5 | 3.0 | 9.0 | 9.0 | 2.2 | 2.2 |
| | 2-Hydroxymethyl methacrylate | 6.0 | 0.5 | 7.5 | 7.5 | 4.6 | 4.6 |
| initiator | Acrylic acid | 3.0 | 3.0 | 4.5 | 4.5 | 4.0 | 4.0 |
| | Benzoyl peroxide | 0.50 | 0.50 | 1.50 | 1.50 | 1.00 | 1.00 |
| Acrylic portion Stage 2 Polymerization | Methyl methacrylate | 15.0 | 15.0 | 2.0 | 5.0 | — | 4.6 |
| | N-Butyl acrylate | 7.5 | 7.5 | 2.0 | 4.5 | — | 3.1 |
| | 2-Hydroxymethyl methacrylate | 7.5 | 7.5 | 6.0 | 0.5 | — | 2.3 |
| initiator | Acrylic acid | 0 | 0 | 0 | 0 | — | 0 |
| | Benzoyl peroxide | 1.50 | 1.50 | 0.50 | 0.50 | — | 0.50 |
| Neutralizer | Dimethylethanolamine | 3.33 | 3.33 | 5.01 | 5.01 | 4.94 | 4.94 |
| Dilution | Deionized water | 180 | 180 | 178 | 178 | 178 | 178 |
| Property values | Resin solid content (%) | 30 | 30 | 30 | 30 | 30 | 30 |
| | Resin acid value (MGKOH/G) | 31 | 31 | 43 | 43 | 34 | 34 |
| | Mean particle size (μM) | 0.26 | 0.28 | 0.22 | 0.22 | 0.52 | 0.38 |
| Storage stability | (40° C. × 120 days) | G | G | G | G | P | P |

[Production of Aqueous Coating Composition]

Example Y-12

After placing 227 parts (solid content: 68 parts) of acrylic modified starch aqueous dispersion No. Y-1 obtained in Example Y-1, 32 parts of BAYHYDUR VPLS-2319 (product of Sumika Bayer Urethane Co., Ltd., hexamethylene diisocyanate-based water-dispersible polyisocyanate compound, solid content: 100%) and 27 parts of deionized water in a container, the components were mixed while stirring to obtain aqueous coating composition Y-B1 with a solid content of 35%.

Examples Y-13 to Y-22 and Comparative Examples Y-3 and Y-4

Aqueous coating compositions No. Y-B2 to No. Y-B13 were obtained in the same manner as Example Y-12, except that the composition in Example Y-12 was changed as listed in table Y-2.

[Preparation and Evaluation of Test Sheets]

Each aqueous coating composition obtained as described above was spray coated onto a polypropylene board to a dry film thickness of 50 μm. It was then dried with an electric hot air dryer at 80° C. for 30 minutes and allowed to stand for one day to prepare a test coated board, and then the finished appearance, coating film non-tackiness and gel fraction were evaluated. The evaluation criteria were the same as the "finished appearance", "coating film non-tackiness" and "gel fraction" for the examples of [I].

TABLE Y-2

| | | Example NO. | | | | | | | | | | | Comp. Ex. NO. | |
| --- | --- | --- | --- | --- | --- | --- | --- | --- | --- | --- | --- | --- | --- | --- |
| | | Y-12 | Y-13 | Y-14 | Y-15 | Y-16 | Y-17 | Y-18 | Y-19 | Y-20 | Y-21 | Y-22 | Y-3 | Y-4 |
| Aqueous coating composition NO. | | Y-B1 | Y-B2 | Y-B3 | Y-B4 | Y-B5 | Y-B6 | Y-B7 | Y-B8 | Y-B9 | Y-B10 | Y-B11 | Y-B12 | Y-B13 |
| Acrylic-modified starch aqueous dispersion NO. | Y-1 | 227 | | | | | | | | | | | | |
| | Y-2 | | 227 | | | | | | | | | | | |
| | Y-3 | | | 227 | | | | | | | | | | |
| | Y-4 | | | | 227 | | | | | | | | | |
| | Y-5 | | | | | 227 | | | | | | | | |
| | Y-6 | | | | | | 227 | | | | | | | |

TABLE Y-2-continued

| | Example NO. | | | | | | | | | | | Comp. Ex. NO. | |
|---|---|---|---|---|---|---|---|---|---|---|---|---|---|
| | Y-12 | Y-13 | Y-14 | Y-15 | Y-16 | Y-17 | Y-18 | Y-19 | Y-20 | Y-21 | Y-22 | Y-3 | Y-4 |
| Y-7 | | | | | | | 227 | | | | | | |
| Y-8 | | | | | | | | 220 | | | | | |
| Y-9 | | | | | | | | | 233 | | | | |
| Y-10 | | | | | | | | | | 220 | | | |
| Y-11 | | | | | | | | | | | 233 | | |
| Y-12 | | | | | | | | | | | | 227 | |
| Y-13 | | | | | | | | | | | | | 227 |
| BAYHYDUR VPLS-2319 | 32 | 32 | 32 | 32 | 32 | 32 | 32 | 34 | 30 | 34 | 30 | 32 | 32 |
| Deionized water | 27 | 27 | 27 | 27 | 27 | 27 | 27 | 32 | 23 | 32 | 23 | 27 | 27 |
| Finished appearance | G | G | G | G | G | G | G | G | G | G | G | F | G |
| Non-tackiness of coating film | G | G | G | G | G | G | G | G | G | G | G | G | G |
| Gel fraction (%) | 88 | 88 | 87 | 89 | 92 | 89 | 91 | 86 | 86 | 86 | 86 | 85 | 84 |

Examples [III]

Examples of the invention for the aforementioned third object will be explained.

[Production of Modified Starch (e)]

Production Example Z-1

After suspending 25 parts of high amylose corn starch (product of Nihon Cornstarch Corp., hydroxyl value: 500 mgKOH/g) in 200 parts of dimethyl sulfoxide (DMSO), the mixture was heated to 90° C. while stirring and held at that temperature for 20 minutes for gelatinization. Next, 20 parts of sodium bicarbonate was added as a catalyst to the solution, and 17 parts of vinyl laurate was added while keeping the temperature at 90° C., prior to 1 hour of reaction at that temperature. Next, 37 parts of vinyl acetate was further added and reaction was continued at 80° C. for 1 hour. The reaction mixture was then poured into tap water, and the mixture was stirred at high speed for disintegration and then filtered and dewatered to obtained esterified starch Z-P1.

[Aqueous Dispersion (Z) of Acrylic Modified Starch (E)]

Production Example Z-2

In a four-necked glass flask equipped with a thermometer, stirrer, reflux condenser, water separator and nitrogen inlet there was placed 50 parts of ethyleneglycol monobutyl ether, the mixture was heated to 50° C. under a nitrogen stream while stirring, and upon reaching 50° C., 60 parts of the esterified starch Z-P1 obtained in Production Example Z-1 was added and the resulting mixture was heated to 120° C. while stirring. After dissolution of the esterified starch, a mixture of 10 parts methyl methacrylate, 5 parts n-butyl acrylate, 5 parts 2-hydroxyethyl methacrylate and 1 part benzoyl peroxide was added dropwise at 120° C. over a period of 1 hour, and upon completion of the dropwise addition the mixture was kept at 120° C. for 1 hour to obtain a reaction product.

Next, a mixture of 10 parts methyl methacrylate, 1 part n-butyl acrylate, 5 parts 2-hydroxyethyl methacrylate, 4 parts acrylic acid and 1 part benzoyl peroxide was added dropwise to the flask at 120° C. over a period of 1 hour, and upon completion of the dropwise addition the mixture was kept at 120° C. for 1 hour to obtain an acrylic-modified esterified starch solution.

The acrylic-modified esterified starch solution was cooled to 90° C., and then 4.45 parts of dimethylethanolamine was added and the mixture was stirred for 15 minutes. Next, 179 parts of deionized water was added dropwise over a period of 1 hour while stirring, to obtain aqueous dispersion (Z) No. Z-1 of an acrylic modified starch (E) with a resin solid content of 30%, a resin acid value of 37 mgKOH/g and a mean particle size of 0.29 μm.

Production Examples Z-3 to Z-6

The aqueous dispersions (Z) No. Z-2 to No. Z-5 of each acrylic modified starch (E) were obtained in the same manner as Production Example Z-2, except that the starting materials, contents and reaction temperature in Production Example Z-2 were as listed in Table Z-1.

TABLE Z-1

| | | Production Example NO. | | | | |
|---|---|---|---|---|---|---|
| | | Z-2 | Z-3 | Z-4 | Z-5 | Z-6 |
| Acrylic-modified starch (E) aqueous dispersion NO. | | Z-1 | Z-2 | Z-3 | Z-4 | Z-5 |
| Ethyleneglycol monobutyl ether | | 50 | 50 | 50 | 50 | 50 |
| Esterified starch Z-P1 | | 60 | 30 | 80 | 60 | 60 |
| Acrylic portion Stage 1 | Methyl methacrylate | 10 | 17.5 | 5 | 15 | 2 |
| | N-Butyl acrylate | 5 | 8.75 | 2.1 | 7.5 | 2 |
| Polymerization initiator | 2-Hydroxyethyl methacrylate | 5 | 8.75 | 2.5 | 7.5 | 6 |
| | Acrylic acid | 0 | 0 | 0.4 | 0 | 0 |
| | Benzoyl peroxide | 1 | 1.75 | 0.5 | 1.5 | 0.5 |
| Acrylic portion Stage 2 | Methyl methacrylate | 10 | 17.5 | 2 | 0.5 | 9 |
| | N-Butyl acrylate | 1 | 5.95 | 2.5 | 0.5 | 9 |
| Polymerization initiator | 2-Hydroxyethyl methacrylate | 5 | 8.75 | 2.5 | 6 | 7.5 |
| | Acrylic acid | 4 | 2.8 | 3 | 3 | 4.5 |
| | Benzoyl peroxide | 1 | 1.75 | 0.5 | 0.5 | 1.5 |
| Neutralizer | Dimethylethanolamine | 4.45 | 3.12 | 3.78 | 3.33 | 5.01 |

TABLE Z-1-continued

|  |  | Production Example NO. | | | | |
| --- | --- | --- | --- | --- | --- | --- |
|  |  | Z-2 | Z-3 | Z-4 | Z-5 | Z-6 |
| Dilution | Deionized water | 179 | 180 | 180 | 180 | 178 |
| Property values | Resin solid content (%) | 30 | 30 | 30 | 30 | 30 |
|  | Resin acid value (MGKOH/G) | 37 | 35 | 30 | 31 | 43 |
|  | Mean particle size (μM) | 0.29 | 0.3 | 0.32 | 0.32 | 0.27 |

Production Example Z-7

In a four-necked glass flask equipped with a thermometer, stirrer, reflux condenser, water separator and nitrogen inlet there was placed 140 parts of toluene, and the mixture was heated to 50° C. under a nitrogen stream while stirring. After a temperature of 50° C. was reached, 70 parts of the esterified starch Z-P1 obtained in Production Example Z-1 was added, the temperature was increased to near 110° C. while stirring, and then toluene was passed through a water separator for water separation for approximately 30 minutes under reflux. After water separation, 0.3 part of 2-isocyanatoethyl acrylate and a trace amount (approximately 0.0004 part) of dibutyltin dilaurate were added while maintaining a temperature of 105° C. for approximately 2 hours of reaction, to obtain a radical polymerizable unsaturated group-containing esterified starch solution.

After then adding 50 parts of ethyleneglycol monobutyl ether to the radical polymerizable unsaturated group-containing esterified starch solution, the temperature was raised to 105° C., the toluene was recovered under reduced pressure, and the solvent in the system was exchanged from toluene to ethyleneglycol monobutyl ether.

The radical polymerizable unsaturated group content of the radical polymerizable unsaturated group-containing esterified starch was 0.030 mmol/g.

The radical polymerizable unsaturated group-containing esterified starch solution that had been solvent-exchanged with ethyleneglycol monobutyl ether was then heated to 120° C., and a mixture of 9.2 parts methyl methacrylate, 2.2 parts n-butyl acrylate, 4.6 parts 2-hydroxyethyl methacrylate, 4.0 parts acrylic acid and 1.00 part benzoyl peroxide was added dropwise over a period of 1 hour while maintaining the same temperature, and upon completion of the dropwise addition the mixture was kept at 120° C. for 1 hour.

Next, a mixture of 4.6 parts methyl methacrylate, 3.1 parts n-butyl acrylate, 2.3 parts 2-hydroxyethyl methacrylate and 0.50 part benzoyl peroxide was added dropwise into the flask over a period of 1 hour while maintaining the temperature of 120° C., and upon completion of the dropwise addition the mixture was kept at 120° C. for 1 hour to obtain an acrylic-modified esterified starch solution.

The acrylic-modified esterified starch solution was cooled to 60° C., and then 4.94 parts of dimethylethanolamine was added and the mixture was stirred for 15 minutes. Next, 178 parts of deionized water was added dropwise over a period of 1 hour while stirring, to obtain aqueous dispersion (Z) No. Z-6 of an acrylic modified starch (E) with a resin solid content of 30%, a resin acid value of 34 mgKOH/g and a mean particle size of 0.22 μm.

Production Examples Z-8 to Z-11

The aqueous dispersions (Z) No. Z-7 to No. Z-10 of each acrylic modified starch (E) were obtained in the same manner as Production Example Z-7, except that the starting materials, contents and reaction temperature in Production Example Z-7 were as listed in Table Z-2.

TABLE Z-2

|  |  | Production Example NO. | | | | |
| --- | --- | --- | --- | --- | --- | --- |
|  |  | Z-7 | Z-8 | Z-9 | Z-10 | Z-11 |
| Acrylic-modified starch (E) aqueous dispersion NO. | | Z-6 | Z-7 | Z-8 | Z-9 | Z-10 |
| Toluene | | 140.0 | 140.0 | 160.0 | 120.0 | 120.0 |
| Esterified starch Z-P1 | | 70.0 | 70.0 | 80.0 | 60.0 | 60.0 |
| 2-Isocyanatoethyl acrylate | | 0.30 | 0.30 | 0.10 | 0.10 | 0.10 |
| Dibutyltin dilaurate | | trace | trace | trace | trace | trace |
| Ethyleneglycol monobutyl ether | | 50.0 | 50.0 | 50.0 | 50.0 | 50.0 |
| Radical-polymerizable unsaturated group content (MMOL/G) | | 0.030 | 0.030 | 0.009 | 0.012 | 0.012 |
| Acrylic portion Stage 1 Polymerization initiator | Methyl methacrylate | 9.2 | 4.6 | 2.0 | 0.5 | 9.0 |
| | N-Butyl acrylate | 2.2 | 3.1 | 2.5 | 0.5 | 9.0 |
| | 2-Hydroxyethyl methacrylate | 4.6 | 2.3 | 2.5 | 6.0 | 7.5 |
| | Acrylic acid | 4.0 | 0 | 3.0 | 3.0 | 4.5 |
| | Benzoyl peroxide | 1.00 | 0.50 | 0.50 | 0.50 | 1.50 |
| Acrylic portion Stage 2 Polymerization initiator | Methyl methacrylate | 4.6 | 9.2 | 5.0 | 15.0 | 2.0 |
| | N-Butyl acrylate | 3.1 | 2.2 | 2.1 | 7.5 | 2.0 |
| | 2-Hydroxyethyl methacrylate | 2.3 | 4.6 | 2.5 | 7.5 | 6.0 |
| | Acrylic acid | 0 | 4.0 | 0.4 | 0 | 0 |
| | Benzoyl peroxide | 0.50 | 1.00 | 0.50 | 1.50 | 0.50 |
| Neutralizer | Dimethylethanolamine | 4.94 | 4.94 | 3.78 | 3.33 | 5.01 |
| Dilution | Deionized water | 178 | 178 | 180 | 180 | 178 |

TABLE Z-2-continued

|  |  | Production Example NO. | | | | |
|---|---|---|---|---|---|---|
|  |  | Z-7 | Z-8 | Z-9 | Z-10 | Z-11 |
| Property values | Resin solid content (%) | 30 | 30 | 30 | 30 | 30 |
|  | Resin acid value (MGKOH/G) | 34 | 34 | 30 | 31 | 43 |
|  | Mean particle size (μM) | 0.22 | 0.28 | 0.26 | 0.26 | 0.22 |

[Production of Effect Pigment Dispersion]

Production Example Z-12

In the stirring/mixing container there were uniformly mixed 19 parts GX-180A (trade name of Asahi Kasei Metals Co., Ltd., aluminum pigment paste, metal content: 74%), 35 parts 2-ethyl-1-hexanol, 8 parts of a phosphate group-containing resin solution (*2) and 0.2 part 2-(dimethylamino) ethanol, to obtain effect pigment dispersion No. Z-1.

(*2) Phosphate group-containing resin solution: A mixed solvent comprising 27.5 parts methoxypropanol and 27.5 parts isobutanol was placed in a reactor equipped with a thermometer, thermostat, stirrer, reflux condenser, nitrogen inlet tube and dropper, and heated to 110° C. Next, 121.5 parts of a mixture comprising 25 parts styrene, 27.5 parts n-butyl methacrylate, 20 parts of a branched higher alkyl acrylate (trade name: "Isostearyl acrylate", product of Osaka Organic Chemical Industry, Ltd.), 7.5 parts 4-hydroxybutyl acrylate, 15 parts of a phosphate group-containing polymerizable monomer solution (*3), 12.5 parts 2-methacryloyloxyethyl acid phosphate, 10 parts isobutanol and 4 parts t-butylperoxy octanoate was added to the mixed solvent over a period of 4 hours, and then a mixture of 0.5 part t-butylperoxy octanoate and 20 parts isopropanol was added dropwise over a period of one hour. The mixture was then aged while stirring for 1 hour to obtain a phosphate group-containing resin solution with a solid content of 50%. The acid value due to the phosphate groups of the phosphate group-containing phosphate group was 83 mgKOH/g, the hydroxyl value was 29 mgKOH/g and the weight-average molecular weight was 10,000.

(*3) Phosphate group-containing polymerizable monomer solution: After placing 57.5 parts monobutylphosphoric acid and 41 parts isobutanol in a reactor equipped with a thermometer, thermostat, stirrer, reflux condenser, nitrogen inlet tube and dropper and heating them to 90° C., 42.5 parts of glycidyl methacrylate was added dropwise over a period of 2 hours. After then ageing the mixture while stirring for 1 hour, 59 parts of isopropanol was added to obtain a phosphate group-containing polymerizable monomer solution with a solid content of 50%. The acid value due to the phosphate groups in the obtained monomer was 285 mgKOH/g.

[Production of Aqueous Coating Composition (I)]

Production Example Z-13

There were uniformly mixed 333.3 parts of aqueous dispersion (Z) No. Z-1 of acrylic modified starch (E), obtained in Production Example Z-2 (solid content: 100 parts), 62 parts of effect pigment dispersion No. Z-1 obtained in Production Example Z-12 (solid content: 18 parts) 5 parts of BAYHYDUR VPLS-2319 (trade name of Sumika Bayer Urethane Co., Ltd., hexamethylene diisocyanate-based water-dispersible polyisocyanate compound, solid content: 100%) and 9.6 parts deionized water, to obtain aqueous coating composition (I) No. Z-1 with a solid content of 30%.

Production Examples Z-14 to Z-24

Aqueous coating compositions (I) No. Z-2 to No. Z-12 were obtained in the same manner as Production Example Z-13, except that the composition in Production Example Z-13 was changed as shown in Table Z-3.

TABLE Z-3

| | | Production Example NO. | | | | | | | | | | | |
|---|---|---|---|---|---|---|---|---|---|---|---|---|---|
| | | Z-13 | Z-14 | Z-15 | Z-16 | Z-17 | Z-18 | Z-19 | Z-20 | Z-21 | Z-22 | Z-23 | Z-24 |
| Aqueous coating composition NO. | | Z-1 | Z-2 | Z-3 | Z-4 | Z-5 | Z-6 | Z-7 | Z-8 | Z-9 | Z-10 | Z-11 | Z-12 |
| Acrylic-modified starch | Z-1 | 333.3 | | | | | | | | | | 333.3 | |
| (E) aqueous dispersion | Z-2 | | 333.3 | | | | | | | | | | |
| NO. | Z-3 | | | 333.3 | | | | | | | | | |
| | Z-4 | | | | 333.3 | | | | | | | | |
| | Z-5 | | | | | 333.3 | | | | | | | |
| | Z-6 | | | | | | 333.3 | | | | | | 333.3 |
| | Z-7 | | | | | | | 333.3 | | | | | |
| | Z-8 | | | | | | | | 333.3 | | | | |
| | Z-9 | | | | | | | | | 333.3 | | | |
| | Z-10 | | | | | | | | | | 333.3 | | |
| Extender pigment dispersion NO. Z-1 | | 62 | 62 | 62 | 62 | 62 | 62 | 62 | 62 | 62 | 62 | 0 | 0 |
| BAYHYDUR VPLS-2319 | | 5 | 5 | 5 | 5 | 5 | 5 | 5 | 5 | 5 | 5 | 0 | 0 |
| Deionized water | | 9.6 | 9.6 | 9.6 | 9.6 | 9.6 | 9.6 | 9.6 | 9.6 | 9.6 | 9.6 | 0 | 0 |

[Production of Saccharide and/or Derivative Thereof with Acryloyl Group]

Production Example Z-25

In a reactor equipped with a distilling apparatus, thermometer and stirrer there were charged 80 parts of dextrin (i) (glucose polymer with average polymerization number of 4, and an average of 14 hydroxyl groups per molecule), 100 parts of methyl isobutyl ketone, 0.16 part of methylhydroquinone, 5.9 parts of lithium hydroxide monohydrate and 506.2 parts of methyl acrylate. The solution was then heated at 90° C. and stirred while blowing in nitrogen, to slowly distill off the methyl acrylate, methanol and methyl isobutyl ketone from the system. The methyl acrylate and methyl isobutyl ketone that disappeared by the distillation were supplemented by addition in that amount to the reactor. The reaction was then monitored by gas chromatography quantitation of the methanol in the reactor and the methanol that had been distilled off, and the mixture was cooled when an average of 6.0 hydroxyl groups per dextrin (i) molecule had been acrylic acid esterified. The reaction mixture was subsequently concentrated under reduced pressure and ethyl acetate was added to the residue to obtain an acrylic acid ester No. Z-1 solution having a solid content of 25%, a weight-average molecular weight of 1,100 and an average of 6.0 acryloyl groups per molecule.

Production Example Z-26

An acrylic acid ester No. Z-2 solution having a weight-average molecular weight of 1,400 and an average of 10.0 acryloyl groups per molecule was obtained in the same manner as Production Example Z-25, except that the reaction in Production Example Z-25 was monitored, by gas chromatography quantitation of the methanol in the reactor and the methanol that had been distilled off, until an average of 10.0 hydroxyl groups of the average of 14 hydroxyl groups per molecule of the dextrin (i) had been acrylic acid esterified, and the reaction time was extended.

Production Example Z-27

An acrylic acid ester No. Z-3 solution having a weight-average molecular weight of 950 and an average of 6.0 acryloyl groups per molecule was obtained in the same manner as Production Example Z-25, except for using dextrin (ii) which was a glucose polymer with an average polymerization number of 3 and having an average of 11 hydroxyl groups per molecule, and the reaction in Production Example Z-25 was monitored, by gas chromatography quantitation of the methanol in the reactor and the methanol that had been distilled off, until an average of 6.0 hydroxyl groups of the average of 11 hydroxyl groups per molecule of the dextrin (ii) had been acrylic acid esterified.

Production Example Z-28

An acrylic acid ester No. Z-4 solution having a weight-average molecular weight of 1,500 and an average of 6.0 acryloyl groups per molecule was obtained in the same manner as Production Example Z-25, except for using dextrin (iii) which was a glucose polymer with an average polymerization number of 6 and having an average of 20 hydroxyl groups per molecule, and the reaction in Production Example Z-25 was monitored, by gas chromatography quantitation of the methanol in the reactor and the methanol that had been distilled off, until an average of 6.0 hydroxyl groups of the average of 20 hydroxyl groups per molecule of the dextrin (iii) had been acrylic acid esterified.

Production Example Z-29

An acrylic acid ester No. Z-5 solution having a weight-average molecular weight of 780 and an average of 6.0 acryloyl groups per molecule was obtained in the same manner as Production Example Z-25, except that trehalose was used instead of dextrin (i), the reaction in Production Example Z-25 was monitored, by gas chromatography quantitation of the methanol in the reactor and the methanol that had been distilled off, and cooling was performed when an average of 6.0 hydroxyl groups per molecule of the trehalose had been acrylic acid esterified.

Production Example Z-30

An acrylic acid ester No. Z-6 solution having a weight-average molecular weight of 780 and an average of 6.0 acryloyl groups per molecule was obtained in the same manner as Production Example Z-25, except that sucrose was used instead of dextrin (i), the reaction in Production Example Z-25 was monitored, by gas chromatography quantitation of the methanol in the reactor and the methanol that had been distilled off, and cooling was performed when an average of 6.0 hydroxyl groups per molecule of the sucrose had been acrylic acid esterified.

[Production of Polymerizable Unsaturated Compound]

Production Example Z-31

In a reactor equipped with a thermometer, thermostat, stirrer, reflux condenser and aerator there were charged 888 parts of isophorone diisocyanate, 464 parts of 2-hydroxyethyl acrylate and 0.7 part of hydroquinonemonomethyl ether, the temperature was raised to 80° C. while blowing air into the reactor and the temperature was maintained for 5 hours, and after confirming that essentially all of the hydroxyl groups of the added 2-hydroxyethyl acrylate had reacted, 136 parts of pentaerythritol, 372 parts of butyl acetate and 0.2 part of dibutyltin dilaurate were added and the temperature was kept at 80° C., and then upon confirming that essentially all of the isocyanate groups of the isophorone diisocyanate had reacted, the mixture was cooled to obtain polymerizable unsaturated compound No. Z-1 having a solid content of 80%. The number-average molecular weight of the resin was approximately 1,500.

[Production of Reactive Polymer Emulsifier]

Production Example Z-32

In a four-necked flask equipped with a stirrer, reflux condenser, thermometer, dropping funnel and nitrogen inlet there was added 1,000 parts of propyleneglycol monomethyl ether acetate, and the mixture was heated to 120° C. while introducing nitrogen gas and stirring. Next, a mixture of 130 parts of styrene, 590 parts of n-butyl methacrylate, 85 parts of 2-hydroxyethyl methacrylate, 5 parts of glycidyl methacrylate, 40 parts of methyl methacrylate and 20 parts of 2,2'-azobis-2-methylbutyronitrile was added dropwise from a drip tank over a period of 3 hours. Upon completion of the dropwise addition, the mixture was kept at the same temperature for 0.5 hour to obtain a copolymer, and then a mixture of 20 parts of styrene, 45 parts of n-butyl methacrylate, 15 parts of 2-hydroxyethyl methacrylate, 60 parts of acrylic acid, 10 parts of methyl methacrylate and 10 parts of t-butylperoxy-2-ethyl hexanoate was added dropwise from a drip tank over a period of 1 hour. Upon completion of the dropwise addition, the mixture was kept at the same temperature for 0.5 hour, and then 50 parts of a solution comprising 10 parts of t-butylperoxy-2-ethyl hexanoate dissolved in 40 parts of propyleneglycol monomethyl ether acetate was added dropwise over a period of 30 minutes. It was then aged for 1 hour. After cooling to 80° C., 50 parts of 2-acryloyloxyethyl isocyanate and 0.1 part of NEOSTAN U-100 (tin-based catalyst) was added and the mixture was stirred for 2 hours. The solvent was distilled off to a solid content of 70% to obtain reactive polymer emulsifier No. Z-1 solution.

[Production of Active Energy Radiation Curable Coating Composition (II)]

Production Example Z-33

After adding and dissolving 3 parts of IRGACURE 184 (trade name of Ciba Specialty Chemicals Co., Ltd., photopolymerization initiator) with respect to 400 parts of the acrylic acid ester No. Z-1 solution obtained in Production Example Z-25 (100 parts solid content), the mixture was diluted to a solid content of 20% with butyl acetate to obtain organic solvent-type active energy radiation curable coating composition No. Z-1.

Production Examples Z-34 to Z-37

Organic solvent-type active energy radiation curable coating compositions (I) No. Z-2 to No. Z-5 were obtained in the same manner as Production Example Z-33, except that the composition in Production Example Z-33 was changed as shown in Table Z-4.

TABLE Z-4

|  |  | Production Example NO. | | | | |
|---|---|---|---|---|---|---|
|  |  | Z-33 | Z-34 | Z-35 | Z-36 | Z-37 |
| Active energy radiation curable coating composition NO. |  | Z-1 | Z-2 | Z-3 | Z-4 | Z-5 |
| Solution of saccharide and/or derivative thereof with acryloyl group | Acrylic acid ester NO. Z-1 solution | 100 |  |  |  | 70 |
|  | Acrylic acid ester NO. Z-2 solution |  | 100 |  |  |  |
|  | Acrylic acid ester NO. Z-5 solution |  |  | 100 |  |  |
|  | Acrylic acid ester NO. Z-6 solution |  |  |  | 100 |  |
| Photopolymerization initiator | IRGACURE 184 | 3 | 3 | 3 | 3 | 3 |
| Polymerizable unsaturated compound | Polymerizable unsaturated compound NO. Z-1 |  |  |  |  | 30 |

The numerical values of the contents indicate solid portions.

Production Example Z-38

The solvent was distilled off from acrylic acid ester No. Z-1 solution obtained in Production Example Z-25 to obtain a solution having a solid content of 70%. To 142.9 parts of this solution (100 parts solid content) there were added 3 parts of DAROCURE 1173 (trade name of Ciba Specialty Chemicals Co., Ltd., 2-hydroxy-2-methyl-1-phenyl-propan-1-one, photopolymerization initiator) and 6 parts of RMA-506 (trade name of Nippon Nyukazai Co., Ltd., polyoxyethylenenonylphenyl ether acrylate, nonionic reactive emulsifier), after which 210.4 parts of deionized water was slowly added while stirring to form an aqueous dispersion. There was further added 1 part of BYK-348 (trade name of Byk-Chemie Corp., surface control agent) to obtain an aqueous-type active energy radiation curable coating composition No. Z-6 having a solid content of 30%.

Production Examples Z-39 to Z-43

Aqueous active energy radiation curable coating compositions (I) No. Z-7 to No. Z-11 were obtained in the same manner as Production Example Z-38, except that the composition in Production Example Z-38 was changed as shown in Table Z-5.

TABLE Z-5

|  |  | Production Example NO. | | | | | | | |
|---|---|---|---|---|---|---|---|---|---|
|  |  | Z-38 | Z-39 | Z-40 | Z-41 | Z-42 | Z-43 | Z-44 | Z-45 |
| Active energy radiation curable coating composition NO. |  | Z-6 | Z-7 | Z-8 | Z-9 | Z-10 | Z-11 | Z-12 | Z-13 |
| Solution of saccharide and/or derivative thereof with acryloyl group | Acrylic acid ester NO. Z-1 solution | 100 |  |  |  |  |  | 100 | 70 |
|  | Acrylic acid ester NO. Z-2 solution |  | 100 |  |  |  |  |  |  |
|  | Acrylic acid ester NO. Z-3 solution |  |  | 100 |  |  |  |  |  |
|  | Acrylic acid ester NO. Z-4 solution |  |  |  | 100 |  |  |  |  |
|  | Acrylic acid ester NO. Z-5 solution |  |  |  |  | 100 |  |  |  |
|  | Acrylic acid ester NO. Z-6 solution |  |  |  |  |  | 100 |  |  |
| Emulsifier | RMA-506 | 6 | 6 | 6 | 6 | 6 | 6 |  | 6 |
|  | Reactive polymer emulsifier NO. Z-1 |  |  |  |  |  |  | 10 |  |

TABLE Z-5-continued

| | | Production Example NO. | | | | | | | |
|---|---|---|---|---|---|---|---|---|---|
| | | Z-38 | Z-39 | Z-40 | Z-41 | Z-42 | Z-43 | Z-44 | Z-45 |
| Photopolymerization initiator | DAROCURE 1173 | 3 | 3 | 3 | 3 | 3 | 3 | 3 | 3 |
| Polymerizable unsaturated compound | Polymerizable unsaturated compound NO. Z-1 | | | | | | | | 30 |
| Surface modifier | BYK-348 | 1 | 1 | 1 | 1 | 1 | 1 | 1 | 1 |

The numerical values of the contents indicate solid portions.

Production Example Z-44

The solvent was distilled off from acrylic acid ester No. Z-1 solution obtained in Production Example Z-25 to obtain a solution having a solid content of 70%. To 142.9 parts of this solution (100 parts solid content) there were added 3 parts of DAROCURE 1173 and 14.3 parts of the reactive polymer emulsifier No. Z-1 obtained in Production Example Z-32 (10 parts solid content), and 218.8 parts of deionized water was slowly added while stirring to form an aqueous dispersion. There was further added 1 part of BYK-348 to obtain an aqueous-type active energy radiation curable coating composition No. Z-12 having a solid content of 30%.

Production Example Z-45

Butyl acetate was added to the polymerizable unsaturated compound No. Z-1 obtained in Production Example Z-31 to obtain a solution having a solid content of 70%. To 142.9 parts of this solution (100 parts solid content) there were added 3 parts of DAROCURE 1173 and 6 parts of RMA-506, and 210.4 parts of deionized water was slowly added while stirring to form an aqueous dispersion. There was further added 1 part of BYK-348 to obtain a composition having a solid content of 30%. Next, 30 parts of the composition was mixed with 70 parts of the aqueous active energy radiation curable coating composition No. Z-6 having a solid content of 30% obtained in Production Example Z-38, while stirring, to obtain aqueous active energy radiation curable coating composition No. Z-13 with a solid content of 30%.

[Production of Acrylic Resin Emulsions (for Comparative Examples)]

Production Example Z-46

In a reactor equipped with a thermometer, thermostat, stirrer, reflux condenser, nitrogen inlet tube and dropper there were charged 130 parts deionized water and 0.52 part of AQUALON KH-10 (trade name of Dai-ichi Kogyo Seiyaku Co., Ltd., reactive emulsifier), and then the mixture was stirred in a nitrogen airflow and the temperature was increased to 80° C. Next, 1% of the total monomer emulsion (1) described below and 5.3 parts of a 6% ammonium persulfate aqueous solutions were introduced into the reactor, and the mixture was kept at 80° C. for 15 minutes. The remaining monomer emulsion (1)(*4) was then added dropwise into the reactor over a period of 3 hours, while maintaining the same temperature. Upon completion of the dropwise addition, the mixture was aged for 1 hour. Next, the monomer emulsion (2)(*5) described below was added dropwise over a period of one hour. After ageing for 1 hour, 40 parts of a 5% dimethylethanolamine aqueous solution was gradually added to the reactor while cooling to 30° C., and a filtrate was obtained by filtration using a 100 mesh nylon cloth, to obtain acrylic resin emulsion No. Z-1 with a mean particle size of 100 nm(*1) and a solid content of 30%. The obtained acrylic resin had an acid value of 33 mgKOH/g and a hydroxyl value of 25 mgKOH/g.
(*4) Monomer emulsion (1): A mixture of 42 parts deionized water, 0.72 part AQUALON KH-10, 2.1 parts methylenebisacrylamide, 2.8 parts styrene, 16.1 parts methyl methacrylate, 28 parts ethyl acrylate and 21 parts n-butyl acrylate was stirred to obtain monomer emulsion (1).
(*5) Monomer emulsion (2): A mixture of 18 parts deionized water, 0.31 part AQUALON KH-10, 0.03 part ammonium persulfate, 5.1 parts methacrylic acid, 5.1 parts 2-hydroxyethyl acrylate, 3 parts styrene, 6 parts methyl methacrylate, 1.8 parts ethyl acrylate and 9 parts n-butyl acrylate was stirred to obtain monomer emulsion (2).

[Production of Aqueous Coating Composition (for Comparative Examples)]

Production Example Z-47

There were uniformly mixed 333.3 parts of the acrylic resin emulsion No. Z-1 obtained in Production Example Z-46 (solid content: 100 parts), 62 parts of the effect pigment dispersion No. Z-1 obtained in Production Example Z-12 (solid content: 18 parts), 5 parts of BAYHYDUR VPLS-2319 and 9.6 parts deionized water, to obtain aqueous coating composition No. Z-13 with a solid content of 30%.

[Production of Active Energy Radiation Curable Coating Composition (for Comparative Examples)]

Production Example Z-48

After adding and dissolving 3 parts of IRGACURE 184 (trade name of Ciba Specialty Chemicals Co., Ltd., photopolymerization initiator) in 125 parts of the polymerizable unsaturated compound No. Z-1 obtained in Production Example Z-31 (100 parts solid content), the solution was diluted to a solid content of 30% with butyl acetate to obtain the solvent-type active energy radiation curable coating composition No. Z-14.

Production Example Z-49

Butyl acetate was added to the active energy radiation curing compound No. Z-1 obtained in Production Example Z-31 to obtain a solution having a solid content of 70%. To 142.9 parts of this solution (100 parts solid content) there were added 3 parts of DAROCURE 1173 and 6 parts of RMA-506, and 210.4 parts of deionized water was slowly added while stirring to form an aqueous dispersion. There was further added 1 part of BYK-348 to obtain an aqueous-type active energy radiation curable coating composition No. Z-15 having a solid content of 30%.

[Formation of Multilayer Coating Film]

Example Z-1

Multilayer coating film No. Z-1 was formed by the following steps.
Step 1: A polycarbonate resin sheet (trade name: DIALITE P, by Mitsubishi Rayon Co., Ltd., 70 mm×150 mm×2 mm) was used as the substrate. The aqueous coating composition (I) No. Z-1 obtained in Production Example Z-13 was applied onto the isopropanol-degreased substrate by air spraying to a dry coating film thickness of 8 μm, and heated and dried at 60° C. for 15 minutes to form a base coating film.

Step 2: The aqueous active energy radiation curable coating composition No. Z-6 obtained in Production Example Z-38 was applied onto the base coating film formed in Step 1 by air spraying to a dry coating film thickness of 12 μm, and heated and dried at 60° C. for 5 minutes.

Step 3: The coating film dried in Step 2 was irradiated with ultraviolet rays at 6,000 J/m² with a high pressure mercury lamp to form multilayer coating film No. Z-1.

The coated sheets with the obtained multilayer coating films were supplied for the following tests. The test results are shown in Table Z-6.

Examples Z-2 to Z-28

Multilayer coating films No. Z-2 to Z-28 were formed by the same steps as Example Z-1, except for using each aqueous coating composition (I) and active energy radiation curable coating composition (II) listed in Table Z-6. The coated sheets with the obtained multilayer coating films were supplied for the following tests. The test results are shown in Table Z-6.

TABLE Z-6

| | | | Example NO. | | | | | | | | | | | | | |
|---|---|---|---|---|---|---|---|---|---|---|---|---|---|---|---|---|
| | | | Z-1 | Z-2 | Z-3 | Z-4 | Z-5 | Z-6 | Z-7 | Z-8 | Z-9 | Z-10 | Z-11 | Z-12 | Z-13 | Z-14 |
| Multilayer coating film NO. | | | Z-1 | Z-2 | Z-3 | Z-4 | Z-5 | Z-6 | Z-7 | Z-8 | Z-9 | Z-10 | Z-11 | Z-12 | Z-13 | Z-14 |
| Aqueous coating composition NO. | | | Z-1 | Z-2 | Z-3 | Z-4 | Z-5 | Z-6 | Z-7 | Z-8 | Z-9 | Z-10 | Z-11 | Z-12 | Z-1 | Z-1 |
| Active energy radiation curable coating composition NO. | | | Z-6 | Z-6 | Z-6 | Z-6 | Z-6 | Z-6 | Z-6 | Z-6 | Z-6 | Z-6 | Z-6 | Z-6 | Z-1 | Z-2 |
| Coating film performance | Biomaterial-derived component content | Coating composition of step 1 | Y | Y | Y | Y | Y | Y | Y | Y | Y | Y | Y | Y | Y | Y |
| | | Coating composition of step 2 | Y | Y | Y | Y | Y | Y | Y | Y | Y | Y | Y | Y | Y | Y |
| | Finished appearance | | G | G | G | G | G | G | G | G | G | G | G | G | G | G |
| | Pencil hardness | | H | H | H | H | H | H | H | H | H | H | H | H | H | 2H |
| | Mar resistance | | G | G | G | G | G | G | G | G | G | G | G | G | G | VG |
| | Substrate adhesion | | G | G | G | G | G | G | G | G | G | G | G | G | G | G |
| | Interlayer adhesion | | G | G | G | G | G | G | G | G | G | G | G | G | G | G |
| | Weather resistance | | G | G | G | G | G | G | G | G | G | G | G | G | G | G |
| | Alkali resistance | | G | G | G | G | G | G | G | G | G | G | G | G | G | G |
| | Solvent resistance | | G | G | G | G | G | G | G | G | G | G | G | G | G | G |

| | | | Example NO. | | | | | | | | | | | | | |
|---|---|---|---|---|---|---|---|---|---|---|---|---|---|---|---|---|
| | | | Z-15 | Z-16 | Z-17 | Z-18 | Z-19 | Z-20 | Z-21 | Z-22 | Z-23 | Z-24 | Z-25 | Z-26 | Z-27 | Z-28 |
| Multilayer coating film NO. | | | Z-15 | Z-16 | Z-17 | Z-18 | Z-19 | Z-20 | Z-21 | Z-22 | Z-23 | Z-24 | Z-25 | Z-26 | Z-27 | Z-28 |
| Aqueous coating composition NO. | | | Z-1 | Z-1 | Z-1 | Z-6 | Z-1 | Z-1 | Z-1 | Z-1 | Z-1 | Z-1 | Z-1 | Z-2 | Z-2 | Z-2 |
| Active energy radiation curable coating composition NO. | | | Z-3 | Z-4 | Z-5 | Z-1 | Z-7 | Z-8 | Z-9 | Z-10 | Z-11 | Z-12 | Z-13 | Z-7 | Z-10 | Z-11 |
| Coating film performance | Biomaterial-derived component content | Coating composition of step 1 | Y | Y | Y | Y | Y | Y | Y | Y | Y | Y | Y | Y | Y | Y |
| | | Coating composition of step 2 | Y | Y | Y | Y | Y | Y | Y | Y | Y | Y | Y | Y | Y | Y |
| | Finished appearance | | G | G | G | G | G | G | G | G | G | G | G | G | G | G |
| | Pencil hardness | | 2H | 2H | 2H | H | 2H | H | H | 2H | 2H | H | H | 2H | 2H | 2H |
| | Mar resistance | | VG | VG | VG | G | VG | G | G | VG | VG | G | VG | VG | VG | VG |
| | Substrate adhesion | | G | G | G | G | G | G | G | G | G | G | G | G | G | G |
| | Interlayer adhesion | | G | G | G | G | G | G | G | G | G | G | G | G | G | G |
| | Weather resistance | | VG | VG | G | G | G | G | G | VG | VG | G | G | G | VG | VG |
| | Alkali resistance | | G | G | G | G | G | G | G | G | G | G | G | G | G | G |
| | Solvent resistance | | G | G | G | G | G | G | G | G | G | G | G | G | G | G |

Comparative Examples Z-1 to Z-6

Multilayer coating films No. Z-29 to Z-34 were formed by the same steps as Example Z-1, except for using the aqueous coating compositions and active energy radiation curable coating compositions listed in Table Z-7. The coated sheets with the obtained multilayer coating films were supplied for the following tests. The test results are shown in Table Z-7.

TABLE Z-7

| | Comp. Ex. NO. | | | | | |
|---|---|---|---|---|---|---|
| | Z-1 | Z-2 | Z-3 | Z-4 | Z-5 | Z-6 |
| Multilayer coating film NO. | Z-29 | Z-30 | Z-31 | Z-32 | Z-33 | Z-34 |
| Aqueous coating composition NO. | Z-13 | Z-13 | Z-13 | Z-13 | Z-1 | Z-1 |

TABLE Z-7-continued

|  |  |  | Comp. Ex. NO. | | | | | |
|---|---|---|---|---|---|---|---|---|
|  |  |  | Z-1 | Z-2 | Z-3 | Z-4 | Z-5 | Z-6 |
| Active energy radiation curable coating composition NO. |  |  | Z-1 | Z-6 | Z-14 | Z-15 | Z-14 | Z-15 |
| Coating film performance | Biomaterial-derived component content | Coating composition of step 1 | N | N | N | N | Y | Y |
|  |  | Coating composition of step 2 | Y | Y | N | N | N | N |
|  | Finished appearance |  | F | F | G | G | F | F |
|  | Pencil hardness |  | H | H | H | H | H | H |
|  | Mar resistance |  | G | G | G | G | G | G |
|  | Substrate adhesion |  | G | G | G | G | G | G |
|  | Interlayer adhesion |  | P | P | G | G | P | P |
|  | Weather resistance |  | G | G | G | G | G | G |
|  | Alkali resistance |  | G | G | G | G | G | G |
|  | Solvent resistance |  | G | G | G | G | G | G |

[Test Methods]
[Biomaterial-Derived Component Content]

Each aqueous coating composition and active energy radiation curable coating composition was evaluated for the presence of biomaterial-derived components, on the following scale.

Yes (Y): An acryl-modified starch or a saccharide and/or derivative thereof with an acryloyl group (biomaterial-derived component) contained in the coating material.

No (N): No acryl-modified starch or saccharide and/or derivative thereof with an acryloyl group (biomaterial-derived component) contained in the coating material.

[Finished Appearance]

The surface condition of each multilayer coating film was visually examined and evaluated as follows.

Good (G): Satisfactory smoothness without problems.

Fair (F): At least one problem noted from among swelling, dulling and flaking, creating problems.

Poor (P): At least one significant problem noted from among swelling, dulling and flaking, creating problems.

[Pencil Hardness]

Following the procedure specified by JIS K5600-5-4 (1999), the core of a pencil was placed against each multilayer coating film surface at an angle of about 45°, and moved forward approximately 10 mm at a uniform speed while firmly pressing it against the test coated sheet surface without breaking the core. This procedure was repeated 5 times at different locations, and the hardness number of the pencil with the greatest hardness that did not tear the coating film was recorded as the pencil hardness.

[Mar Resistance]

Each testing coated sheet was subjected to a Taber abrasion test (CF-10P truck wheel, 500 g load, 100 rotations), according to ASTM D1044. Before and after the test, the glossiness of each coating film surface was measured according to the mirror surface glossiness (60 degrees) test of JIS K 5600-4-7(1999). The glossiness after the test with respect to the glossiness before the test was calculated as the gloss retention (%), and was evaluated on the following scale.

Very Good (VG): At least 90% gloss retention.
Good (G): At least 80% and less than 90% gloss retention.
Fair (F): At least 60% and less than 80% gloss retention.
Poor (P): Less than 60% gloss retention.

[Substrate Adhesion, Interlayer Adhesion]

Following the procedure specified by JIS K5600-5-6 (1990), a 100-square grid at 1 mm×1 mm was formed in each multilayer coating film and adhesive tape was attached to the surface, and after abruptly peeling it off, the number of squares of the coating film remaining was evaluated. Peeled sections between the article to be coated and base coating film were evaluated as lacking substrate adhesion. Peeled sections between the multilayer coating film layers were evaluated as having substrate adhesion but lacking interlayer adhesion.

Good (G): Number of remaining squares/total number of squares=100/100.

Fair (F): Number of remaining squares/total number of squares=90-99/100.

Poor (P): Number of remaining squares/total number of squares=89 or less/100.

[Weather Resistance]

Each test sheet was subjected to a weather resistance test for 500 hours using a sunshine weathermeter based on JIS K 5600-7-8(1999).

Very Good (VG): Absolutely no abnormalities on the coating film surface, with a color difference ΔE of less than 0.3 according to JIS Z 8730, for the test sheet initially and after the test.

Good (G): Slight yellowing, with a color difference ΔE of at least 0.3 and less than 0.5 according to JIS Z 8730, for the test sheet initially and after the test, which was an acceptable level as a product.

Fair (F): Yellowing of the coating film, with a color difference ΔE of at least 0.5 and less than 0.8 according to JIS Z 8730, for the test sheet initially and after the test.

Poor (P): Notable yellowing of the coating film, with a color difference ΔE of at least 0.8 according to JIS Z 8730, for the test sheet initially and after the test.

[Alkali Resistance]

After dropwise addition of 0.5 mL of a 1% sodium hydroxide aqueous solution onto each multilayer coating film, it was allowed to stand for 24 hours in an atmosphere at 20° C., 65% RH, and then the coating surface was wiped with gauze and outer appearance thereof visually evaluated.

Good (G): Absolutely no abnormalities on coating film surface.

Fair (F): Coloring (whitening) observed on coating film surface.

Poor (P): Notable coloration (whitening) observed on coating film surface.

[Solvent Resistance]

Two sheets of filter paper were placed on each multilayer coating film surface, and the filter paper sheets were wetted by dropwise addition of 78% ethanol and 2% formalin on each filter paper using a dropper. The dropwise addition with the dropper was carried out 5 times at 1 hour intervals, and then after 2 hours the filter paper was removed and the coating film surface was observed and visually evaluated.

Good (G): Absolutely no abnormalities, such as blistering or peeling.

Fair (F): Moderate abnormalities, such as slight blistering or peeling visible on at least one coating film.

Poor (P): At least one coating film dissolved.

What is claimed is:

1. An aqueous dispersion (X) having hydrophilic side chains and hydrophobic side-chains,
wherein the aqueous dispersion (X) is obtained by radical polymerization reaction of a radical polymerizable unsaturated monomer mixture (b1) in the presence of starch and/or modified starch (a) to obtain a reaction product, radical polymerization reaction of a radical polymerizable unsaturated monomer mixture (b2) in the presence of the reaction product to obtain an acrylic modified starch (A), and then dispersing the acrylic modified starch (A) in an aqueous medium, and the radical polymerizable unsaturated monomer mixture (b1) forms the hydrophobic side chains and the radical polymerizable unsaturated monomer mixture (b2) forms the hydrophilic side chains,
the radical polymerizable unsaturated monomer mixture (b1) consists of:
less than 5% by mass of a carboxyl group-containing radical polymerizable unsaturated monomer,
5-95% by mass of a hydroxyl group-containing radical polymerizable unsaturated monomer and
5-95% by mass of other radical polymerizable unsaturated monomers,
the radical polymerizable unsaturated monomer mixture (b2) consists of:
5-95% by mass of a carboxyl group-containing radical polymerizable unsaturated monomer,
5-95% by mass of a hydroxyl group-containing radical polymerizable unsaturated monomer and
0-90% by mass of other radical polymerizable unsaturated monomers,
the carboxyl group-containing radical polymerizable unsaturated monomer is selected from the group consisting of acrylic acid, methacrylic acid, crotonic acid, itaconic acid, maleic acid, fumaric acid, 2-carboxyethyl (meth)acrylate, 2-carboxypropyl(meth)acrylate, and 5-carboxypentyl(meth)acrylate, or is a combination thereof,
the hydroxyl group-containing radical polymerizable unsaturated monomer is selected from the group consisting of 2-hydroxyethyl(meth)acrylate, 3-hydroxypropyl(meth)acrylate, 4-hydroxybutyl(meth)acrylate, (poly)ethyleneglycol mono(meth)acrylate, polypropyleneglycol mono(meth)acrylate, polybutyleneglycol mono(meth)acrylate, and a lactone-modified form of hydroxyl group-containing radical polymerizable unsaturated monomers thereof, or is a combination thereof, and
the acid value of the acrylic modified starch (A) is in the range of 10-150 mgKOH/g.

2. The aqueous dispersion (X) according to claim 1, wherein the starch and/or modified starch (a) is 20-90 parts by mass, the radical polymerizable unsaturated monomer mixture (b1) is 5-40 parts by mass, and the radical polymerizable unsaturated monomer mixture (b2) is 5-40 parts by mass, with respect to 100 parts by mass as the total of the starch and/or modified starch (a), radical polymerizable unsaturated monomer mixture (b1) and radical polymerizable unsaturated monomer mixture (b2).

3. The aqueous dispersion (X) according to claim 1, wherein the starch and/or modified starch (a) comprises at least 30% by mass of an esterified starch.

4. The aqueous dispersion (X) according to claim 1, wherein the radical polymerization initiator used for radical polymerization reaction of the radical polymerizable unsaturated monomer mixture (b1) and/or radical polymerizable unsaturated monomer mixture (b2) in the presence of the starch and/or modified starch (a) is benzoyl peroxide or t-butylperoxyisobutyl carbonate.

5. An aqueous coating composition comprising an aqueous dispersion (X) according to claim 1.

6. A coated article obtained by coating an article with the aqueous coating composition according to claim 5.

7. The aqueous dispersion (X) according to claim 1, wherein the acrylic modified starch (A) has core-shell structure, and the hydrophilic side chains and hydrophobic side-chains form shell sections and core sections, respectively.

8. An aqueous dispersion (X) having hydrophilic side chains and hydrophobic side-chains,
wherein the aqueous dispersion (X) is obtained by radical polymerization reaction of a radical polymerizable unsaturated monomer mixture (b2) in the presence of starch and/or modified starch (a) to obtain a reaction product, radical polymerization reaction of a radical polymerizable unsaturated monomer mixture (b1) in the presence of the reaction product to obtain an acrylic modified starch (A), and then dispersing the acrylic modified starch (A) in an aqueous medium, and the radical polymerizable unsaturated monomer mixture (b1) forms the hydrophobic side chains and the radical polymerizable unsaturated monomer mixture (b2) forms the hydrophilic side chains,
the radical polymerizable unsaturated monomer mixture (b1) consists of:
less than 5% by mass of a carboxyl group-containing radical polymerizable unsaturated monomer,
5-95% by mass of a hydroxyl group-containing radical polymerizable unsaturated monomer and
0-95% by mass of other radical polymerizable unsaturated monomers,
the radical polymerizable unsaturated monomer mixture (b2) consists of:
5-95% by mass of a carboxyl group-containing radical polymerizable unsaturated monomer,
5-95% by mass of a hydroxyl group-containing radical polymerizable unsaturated monomer and
0-90% by mass of other radical polymerizable unsaturated monomers, the carboxyl group-containing radical polymerizable unsaturated monomer is selected from the group consisting of acrylic acid, methacrylic acid, crotonic acid, itaconic acid, maleic acid, fumaric acid, 2-carboxyethyl(meth)acrylate, 2-carboxypropyl (meth)acrylate, and 5-carboxypentyl(meth)acrylate, or is a combination thereof,
the hydroxyl group-containing radical polymerizable unsaturated monomer is selected from the group consisting of 2-hydroxyethyl(meth)acrylate, 3-hydroxypropyl(meth)acrylate, 4-hydroxybutyl(meth)acrylate, (poly)ethyleneglycol mono(meth)acrylate, polypropyleneglycol mono(meth)acrylate, polybutyleneglycol mono(meth)acrylate, and a lactone-modified form of hydroxyl group-containing radical polymerizable unsaturated monomers thereof, or is a combination thereof, and the acid value of the acrylic modified starch (A) is in the range of 10-150 mgKOH/g.

* * * * *